(12) United States Patent
Takaki et al.

(10) Patent No.: US 9,713,983 B2
(45) Date of Patent: Jul. 25, 2017

(54) LANE BOUNDARY LINE RECOGNITION APPARATUS AND PROGRAM FOR RECOGNIZING LANE BOUNDARY LINE ON ROADWAY

(71) Applicant: DENSO CORPORATION, Kariya, Aichi-pref. (JP)

(72) Inventors: Masanari Takaki, Chiryu (JP); Kenji Kobayashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/698,952

(22) Filed: Apr. 29, 2015

(65) Prior Publication Data

US 2015/0332101 A1    Nov. 19, 2015

(30) Foreign Application Priority Data

May 14, 2014   (JP) ................. 2014-100433

(51) Int. Cl.
*G06K 9/00* (2006.01)
*B60R 1/00* (2006.01)
(Continued)

(52) U.S. Cl.
CPC .................. *B60R 1/00* (2013.01); *B60T 7/22* (2013.01); *G06K 9/00798* (2013.01);
(Continued)

(58) Field of Classification Search
CPC  G06K 9/00798; B60R 2300/804; B60R 1/00; B60R 2300/101–2300/108;
(Continued)

(56) References Cited

U.S. PATENT DOCUMENTS 5,001,558 A * 3/1991 Burley ................... H04N 5/332
                                                        348/164
5,307,419 A * 4/1994 Tsujino ................ G05D 1/0223
                                                        348/119
(Continued)

FOREIGN PATENT DOCUMENTS

JP     H11-296799 A     10/1999
JP     2010-282601 A    12/2010

OTHER PUBLICATIONS

McCall et al., "Video-Based Lane Estimation and Tracking for Driver Assistance: Survey, System, and Evaluation", Mar. 6, 2006, IEEE, IEEE Transactions on Intelligent Transportation Systems, vol. 7, iss. 1, p. 20-37.*

(Continued)

*Primary Examiner* — Chan Park
*Assistant Examiner* — Timothy Choi
(74) *Attorney, Agent, or Firm* — Posz Law Group, PLC

(57) ABSTRACT

A boundary line recognition apparatus receives detection results transmitted from camera devices and a laser radar device performing different optical detection methods. These detection results indicate information regarding a lane boundary line of a vehicle lane on a roadway on which an own vehicle drives. The apparatus further obtains surrounding environmental information of the own vehicle on the roadway, and selects at least one of the camera devices and the laser radar device suitable for correctly recognizing the lane boundary line on the basis of the environmental information. The apparatus finally recognizes the lane boundary line with high accuracy on the basis of the detection result transmitted form one or more devices selected based on the environment information.

13 Claims, 22 Drawing Sheets

(51) Int. Cl.
*H04N 7/18* (2006.01)
*G08G 1/16* (2006.01)
*B60T 7/22* (2006.01)

(52) U.S. Cl.
CPC ............. *G08G 1/167* (2013.01); *H04N 7/183* (2013.01); *B60R 2300/105* (2013.01); *B60R 2300/301* (2013.01); *B60R 2300/804* (2013.01); *B60T 2201/08* (2013.01); *B60T 2201/089* (2013.01)

(58) Field of Classification Search
CPC ....... B60R 2300/301; B60R 2300/8053; B60T 7/22; B60T 2201/08; B60T 2201/089; G08G 1/167; H04N 7/183
See application file for complete search history.

(56) References Cited

U.S. PATENT DOCUMENTS

2008/0036576 A1* 2/2008 Stein .................. B60R 1/00
340/425.5
2010/0253602 A1* 10/2010 Szczerba ............... G01S 13/723
345/8

OTHER PUBLICATIONS

Zomotor et al., "Sensor Fusion for Improved Vision Based Lane Recognition and Object Tracking With Range-Finders", Nov. 12, 1997, IEEE, IEEE Conf. on Intelligent Transportation System, 1997, p. 595-600.*

* cited by examiner

FIG. 28

| OBSTACLE FACTORS | | SENSOR STRUCTURE | | | | | | EXAMPLE OF OBSTACLE FACTOR JUDGMENT | COUNTERMEASURE |
|---|---|---|---|---|---|---|---|---|---|
| | | FIRST FRONT SIDE CAMERA (NARROW ANGLE) | SURROUNDING CAMERAS (WIDE ANGLE) | LASER RADAR DEVICE | MAP | MILLIMETER WAVE RADAR DEVICE | SONAR DEVICE | | |
| WEATHER | RAIN | ✓ | | | | | | JUDGE OBSTACLE FACTOR ON THE BASIS OF WIPER SIGNAL AS TRAFFIC INFORMATION AND UNFOCUSED AREA IN IMAGE | USE OF INFORMATION OBTAINED BY FIRST FRONT SIDE CAMERA MOUNTED TO A WIPER DEVICE BECAUSE LENSES OF SURROUNDING CAMERAS ARE EXPOSED TO OUTSIDE ATMOSPHERE. RAIN DROPS ARE OFTEN ATTACHED ON SURFACES OF LENSES. LASER RADAR DEVICE IS WEAK IN RAIN WEATHER. |
| TIME ZONE | AFTERNOON SUN | (✓) | ✓ | ✓ | | | | JUDGE OBSTACLE FACTOR ON THE BASIS OF SATURATION AMOUNT OF LUMINOSITY VALUE OF PIXELS IN AREA AROUND VANISHING POINT IN IMAGE | IMAGE OBTAINED BY FIRST FRONT SIDE CAMERA IS BLACKED OUT. USE OF INFORMATION OBTAINED BY SURROUNDING CAMERAS WHICH ARE NOT TOWARD SUN, AND LASER RADAR INFORMATION OF LASER RADAR DEVICE WHICH IS INSUSCEPTIBLE TO LIGHT OF OUTSIDE. |
| | SHADOW | | (✓) | ✓ | | | | JUDGE OBSTACLE FACTOR ON THE BASIS OF AREA HAVING LUMINOSITY VALUE DIFFERENCE OF NOT LESS THAN PREDETERMINED VALUE ON ROAD SURFACE (IN LOWER AREA OF VANISHING POINT) IN IMAGE | WHEN WHITE LINE IS IN SHADOW UNDER MIXTURE OF SUNLIGHT AND SHADOW IN IMAGE, WHITE LINE IS UNDEREXPOSED (BLACKED OUT) AND IT BECOMES DIFFICULT TO RECOGNIZE WHITE LINE. USE OF LASER RADAR INFORMATION OF LASER RADAR DEVICE WHICH IS INSUSCEPTIBLE TO LIGHT OF OUTSIDE. |
| | NIGHT | ✓ | | ✓ | | | | JUDGE OBSTACLE FACTOR ON THE BASIS OF VEHICLE INFORMATION SUCH AS ILLUMINANCE INFORMATION, TIME INFORMATION, CAMERA INFORMATION SUCH AS SHUTTER SPEED AND GAIN CONTROL VALUE OF CAMERAS | USE OF FIRST FRONT SIDE CAMERA OBTAINING IMAGE WITHIN IRRADIATION AREA OF HEAD LAMPS AND LASER RADAR DEVICE WHICH IS INSUSCEPTIBLE TO LIGHT OF OUTSIDE. NOT USE SURROUNDING CAMERAS BECAUSE OF HAVING NO LIGHT SOURCE OF IRRADIATING LIGHT ON SURFACE OF ROADWAY |
| TRAFFIC STATE | TRAFFIC CONGESTION | | ✓ | | ✓ | | | JUDGE OBSTACLE FACTOR ON THE BASIS OF INFORMATION OBTAINED BY MILLIMETER WAVE RADAR DEVICE AND SONAR DEVICE | IT IS DIFFICULT TO RECOGNIZE WHITE LINE ON IMAGE WHEN DISTANCE BETWEEN OWN VEHICLE AND VEHICLE AHEAD IS SMALL. USE SURROUNDING CAMERAS WHICH OBTAIN IMAGES AROUND OWN VEHICLE |
| | ROAD WORK | ✓ | ✓ | ✓ | | | | JUDGE OBSTACLE FACTOR ON THE BASIS OF VICS INFORMATION | BECAUSE THERE ARE OFTEN TEMPORARY WHITE LINES PAINTED ON ROADWORK AREA, IT IS NECESSARY TO LOOSE CONDITIONS TO USE OBSTACLE FACTORS IN ORDER TO CORRECTLY RECOGNIZE WHITE LINE. |

FIG.29

| Obstacle Factors | | Sensor Structure | | | | | | Example of Obstacle Factor Judgment | Countermeasure |
|---|---|---|---|---|---|---|---|---|---|
| | | First Front Side Camera (Narrow Angle) | Surrounding Cameras (Wide Angle) | Laser Radar Device | Map | Millimeter Wave Radar Device | Sonar Device | | |
| Road Shape | Change of Longitudinal Slope | ✓ | | | ✓ | | | Judge obstacle factor on the basis of change amount of longitudinal slope in front of own vehicle by using longitudinal slope as map information | Suppress incorrect detection by changing recognition area on image obtained by first front side camera |
| | Tunnel-Inlet/Outlet | | ✓ | ✓ | ✓ | | | Judge obstacle factor on the basis of presence of underexposed (blacked-up) area or whiteout in image obtained by first front side camera | Use of camera information obtained by surrounding cameras not suitable for detecting image in tunnel and laser radar information of laser radar device which is insusceptible to external light |
| | Sharp Curve | | ✓ | | ✓ | | | Judge obstacle factor on the basis of curvature of curve as map information | When white line is detected in lateral direction at sharp curve on roadway in image obtained by first front side camera, surrounding cameras are used for obtaining images around own vehicle |
| | Branch Point/Junction Point | ✓ | | | ✓ | | | Judge obstacle factor on the basis of branch point/junction point as map information | Because solid white line is painted at branch point/junction point on roadway, there is possible extension of solid white line in recognition result. It is possible to avoid incorrect detection of white line on the basis of detection result of branch point/junction point. |
| | Asphalt Road/Concrete Road | ✓ | | | ✓ | | | Judge obstacle factor on the basis of type of surface of roadway and distribution of illuminance on surface of roadway | It is possible to vary threshold value of edge of white line edge extracted from image obtained by first front side camera. |

LANE BOUNDARY LINE RECOGNITION APPARATUS AND PROGRAM FOR RECOGNIZING LANE BOUNDARY LINE ON ROADWAY

CROSS-REFERENCE TO RELATED APPLICATION

This application is related to and claims priority from Japanese Patent Application No. 2014-100433 filed on May 14, 2014, the contents of which are hereby incorporated by reference.

BACKGROUND OF THE INVENTION

1. Field of the Invention

The present invention relates to lane boundary line recognition apparatus and programs capable of recognizing a lane boundary line of a roadway on which an own vehicle drives. The lane boundary line separates the inside of a vehicle lane (as a part of a roadway), for the own vehicle on which the own vehicle drives, from the outside of the vehicle lane or from another vehicle lane.

2. Description of the Related Art

There have been known conventional techniques, for example, Japanese patent laid open publication No. H11-296799, which recognize a lane boundary line on the basis of image obtained by an in-vehicle camera, and further estimates the lane boundary line on the basis of map information. When a recognition accuracy of the lane boundary line recognized by using the image is low, the conventional technique selects and uses the lane boundary line estimated on the basis of the map information instead of using the recognized lane boundary line obtained on the basis of the in-vehicle camera.

However, there is a tendency of reducing the recognition accuracy of recognizing a lane boundary line on the basis of the map information. When the conventional technique uses the lane boundary line estimated on the basis of the map information without using the recognition results of lane boundary line by using the image obtained by the in-vehicle cameras, there is often a possible problem of reducing the recognition accuracy of the lane boundary line.

SUMMARY

It is therefore desired to provide a lane boundary line recognition apparatus and a program capable of recognizing a lane boundary line with high accuracy, which indicates the boundary of a vehicle lane on which an own vehicle drives.

An exemplary embodiment provides a lane boundary line recognition apparatus having a plurality of boundary line recognizers, and an environmental information obtaining section and a selection section. The lane boundary line recognition apparatus recognizes a lane boundary line of a vehicle lane on a roadway on which an own vehicle drives. The lane boundary line separates an inside of the vehicle lane from the outside of the vehicle lane. The boundary line recognizers recognize one or more lane boundary lines by using different optical detection methods. The environmental information obtaining section obtains environmental information which represent surrounding environment of the own vehicle. The selection section selects at least one of the boundary line recognizers suitable for correctly recognizing the lane boundary line of the vehicle lane of the own vehicle on the basis of the environmental information.

According to the lane boundary line recognition apparatus having the structure previously described, the environmental information obtaining section obtains environmental information indicating surrounding information of the roadway of the own vehicle, and the selection section selects at least one of the boundary line recognizers such as various types of camera devices and the laser radar device suitable for correctly recognizing the lane boundary line based on the environmental information. The lane boundary line recognition apparatus recognizes the lane boundary line with high accuracy based on the detection results transmitted form one or more boundary line recognizers selected based on the environment information.

It is possible to use programs in order to realize the function of each of the components in the lane boundary line recognition apparatus having the structure previously described.

BRIEF DESCRIPTION OF THE DRAWINGS

A preferred, non-limiting embodiment of the present invention will be described by way of example with reference to the accompanying drawings, in which:

FIG. 28 is a view showing a first disturbance map, to be used by the lane boundary line recognition apparatus 1 according to the exemplary embodiment of the present invention, which indicates a relationship between information to be used for recognizing obstructive factors, a sensor structure to be used for performing the white line judgment process, and the obstructive factors;

FIG. 29 is a view showing a second disturbance map to be used by the lane boundary line recognition apparatus 1 according to the exemplary embodiment of the present invention;

DETAILED DESCRIPTION OF THE PREFERRED EMBODIMENTS

Figure 1:
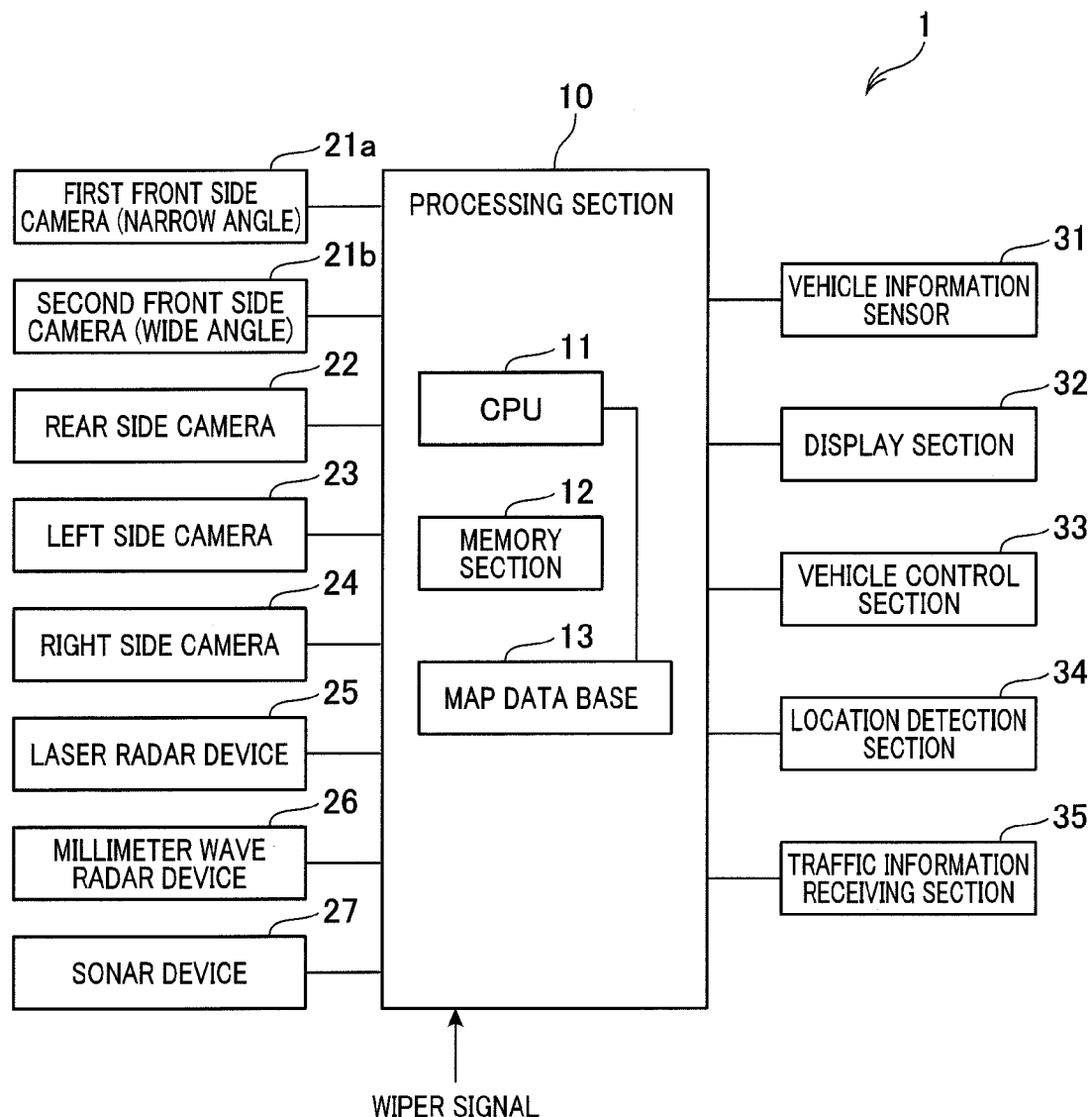
FIG. 1 is a block diagram showing a structure of a lane boundary line recognition apparatus 1 according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

EXEMPLARY EMBODIMENT

A description will be given of a lane boundary line recognition apparatus 1 and a program for recognizing a lane boundary line on a roadway according to an exemplary embodiment.

FIG. 1 is a block diagram showing a structure of the lane boundary line recognition apparatus 1 according to then exemplary embodiment.

The lane boundary line recognition apparatus 1 is mounted on a motor vehicle (hereinafter, also referred to as the "own vehicle"), for example. The lane boundary line recognition apparatus 1 recognizes a white lane boundary line of a vehicle lane on a roadway such as a highway by using images obtained by a plurality of cameras. For example, these cameras are composed of a first front side camera 21a having a narrow angle, a second front side camera 21b having a wide angle, a rear side camera 22, a left side camera 23, a right side camera 24, and a laser radar device 25. These cameras 21a, 21b, 22 to 24 and the laser radar device 25 perform different optical detection methods in order to obtain surrounding scenes i.e., images of the own vehicle.

The exemplary embodiment will explain the lane boundary line recognition process capable of recognizing a white lane boundary line. However, the subject matter of the present invention is not limited by the exemplary embodiment. The lane boundary line recognition apparatus 1 can recognize lane boundary lines other than a white lane boundary line.

The lane boundary line recognition apparatus 1 according to the exemplary embodiment selects at least one of these cameras 21a, 21b, 22 to 24 and the laser radar device 25 on the basis of information of surrounding environment of the roadway on which the own vehicle drives.

In more detail, as shown in FIG. 1, the lane boundary line recognition apparatus 1 has a processing section 10, the first front side camera 21a having a narrow angle, the second front side camera 21b having a wide angle, the rear side camera 22, the left side camera 23, the right side camera 24, the laser radar device 25, a millimeter wave radar device 26, sonar devices 27, a vehicle information sensor 31, a display section 32, a vehicle control section 33, a location detection section 34 and a traffic information receiving section 35.

The first front side camera 21a obtains narrow angle image of a scene in front of the own vehicle. The second front side camera 21b obtains wide angle image of a scene in front of the own vehicle. The first front side camera 21a and the second front side camera 21b are arranged in the inside of a front bumper of the own vehicle in order to obtain image of a landscape in front of the own vehicle, i.e. image of the front scene of the own vehicle.

In particular, in order to obtain a bird's-eye image, each of the second front side camera 21b, the rear side camera 22, the left side camera 23 and the right side camera 24 has a wide angle, as compared with the narrow angle of the first front side camera 21a.

The rear side camera 22 is arranged in the inside of a rear bumper in order to obtain rear scene image of the own vehicle.

The left side camera 23 is arranged at a left side mirror of the own vehicle in order to obtain left side scene image of the own vehicle. The right side camera 24 is arranged at a right side mirror of the own vehicle in order to obtain right side scene image of the own vehicle.

These cameras 21a, 21b, 22 to 24 obtain images every 33 milliseconds, and transmit the obtained images to the processing section 10.

In particular, the second front side camera 21b, the rear side camera 22, the left side camera 23 and the right side camera 24 correspond to surrounding cameras 21b to 24.

The images obtained by the surrounding cameras 21b, 22 to 24 are combined and a coordinate transform of the obtained images is performed to generate bird's-eye image. The generated bird's-eye image is a top view image so as to look down on the own vehicle from a viewpoint in the directly overhead direction.

The laser radar device 25 irradiates a laser beam toward a front area in front of the own vehicle, receives a reflected laser beam reflected by an object, and obtains a distance to the object on the basis of the reflected laser beam. Further, the laser radar device 25 detects a strength of the reflected laser beam, and detects traffic markings such as a lane white line on a roadway on the basis of the strength of the reflected laser beam. The laser radar device 25 transmits the detection results to the processing section 10.

The millimeter wave radar device 26 irradiates a millimeter wave toward a front area in front of the own vehicle, receives a reflected millimeter wave, and obtains a distance to the object on the basis of the reflected millimeter wave. The millimeter wave radar device 26 transmits the detection results regarding the obtained distance to the processing section 10.

The sonar devices 27 are arranged at four corner sections of the own vehicle, for example. The sonar device 27 irradiate an acoustic wave toward a front area in front of the own vehicle, receives a reflected acoustic wave, and obtains a distance between the own vehicle and the object (as obstacle) on the basis of the reflected acoustic wave. The sonar device 27 transmits the detection results regarding the obtained distance to the processing section 10.

The vehicle information sensor 31 comprises a plurality of sensors capable of detecting various conditions of the own vehicle. For example, the vehicle information sensor 31 has a vehicle speed sensor capable of detecting a vehicle speed of the own vehicle, a steering angle sensor capable of detecting a steering angle, an illuminance sensor capable of detecting a surrounding illuminance of the own vehicle, etc. The vehicle information sensor 31 transmits the detection results to the processing section 10.

The display section 32 is a widely known display device to receive image signals transmitted from the processing section 10 and display image on the basis of the received image signals.

The vehicle control section 33 receives location information regarding the detected lane white line transmitted from the processing section 10, and performs the control process in order to prevent departure of the own vehicle from the detected lane white line on the basis of the location information regarding the detected lane white line.

The vehicle control section 33 performs the control process to prevent the own vehicle from its drive lane and avoid a collision with obstacles such as another vehicle.

The location detection section 34 is a receiver for a global positioning system (GPS), and transmits location information of the own vehicle to the processing section 10.

The traffic information receiving section 35 is a receiver capable of receiving FM multiplex broadcasting or VICS (Vehicle Information and Communication System®, which is a trademark) containing traffic information. The traffic information receiving section 35 transmits received information to the processing section 10. The VICS is an innovative information and communication system, enables drivers to receive real-time road traffic information about congestion and regulation 24 hours a day, everyday. This information is edited and processed by Vehicle Information and Communication System Center.

The road traffic information, or VICS information is edited and processed in VICS center is transmitted to each car navigation equipment via beacons or FM multiplex broadcasting devices which is installed on various roads across the country. There are two types of beacon, one is a radio wave beacon on expressways, the other is an infrared beacon on major ordinary roads. FM multiplex broadcasting provides wide area information, and beacons send necessary and detailed information about nearest road condition based on the location where the own vehicle is moving.

The processing section 10 is a known computer comprised of a central processing unit (CPU), and a memory section 12. The memory section 12 has a read only memory (ROM), a random access memory (RAM), etc. The CPU 11 performs various programs stored in the memory section 12 in order to execute various processes such as a boundary line recognition process which will be explained in detail later.

The processing section 10 receives a wiper signal which indicates the operational condition of a wiper device (omitted from drawings) of the own vehicle.

The processing section 10 has a map data base 13 in which road slope information of each roadway, a location of a tunnel inlet, a location of a tunnel outlet, etc.

Figure 2:
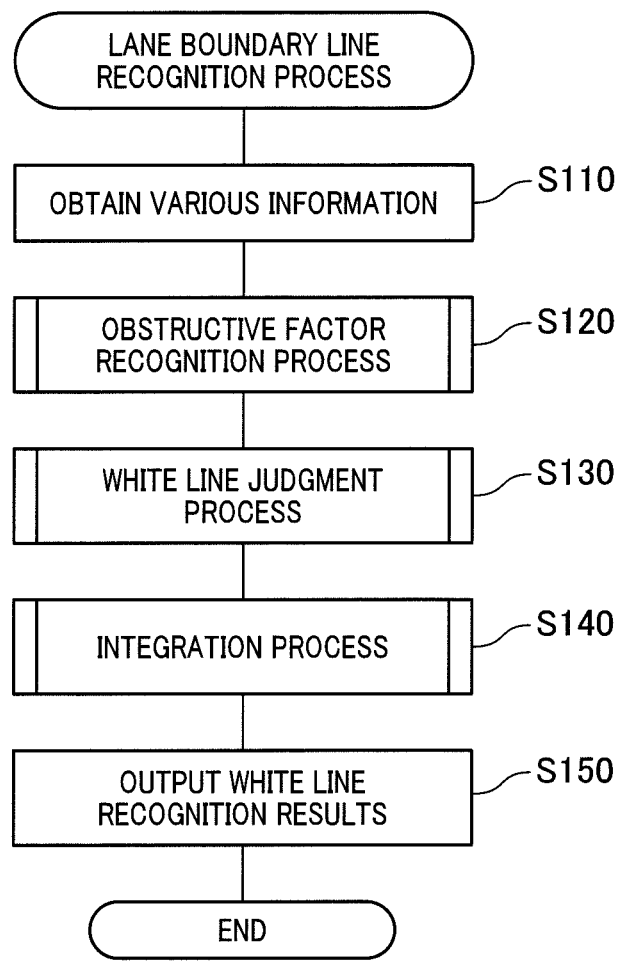
FIG. 2 is a flow chart showing a lane boundary line recognition process performed by a central processing unit (CPU) 11 in a processing section 10 in the lane boundary line recognition apparatus 1 according to the exemplary embodiment shown in FIG. 1.

The processing section 10 having the structure previously described performs the lane boundary line recognition process shown in FIG. 2.

FIG. 2 is a flow chart showing the lane boundary line recognition process performed by the CPU 11 in the processing section 10 in the lane boundary line recognition apparatus 1 according to the exemplary embodiment shown in FIG. 1.

When a power source of the processing section 10 is turned on, the CPU 11 in the processing section 10 starts to execute the lane boundary line recognition process shown in FIG. 2.

The CPU 11 in the processing section 10 executes the lane boundary line recognition process every a predetermined period (for example, every 33 milliseconds).

As shown in FIG. 2, in step S110, the processing section 10 obtains various information which contain: a current location of the own vehicle; map information corresponding to the current location of the own vehicle; image data obtained by the first front side camera 21a, the second front side camera 21b, the rear side camera 22, the left side camera 23, and the right side camera 24; and detection data transmitted from the laser radar device 25, the millimeter wave radar device 26 and the sonar devices 27. The operation flow goes to step S120.

Figure 3:
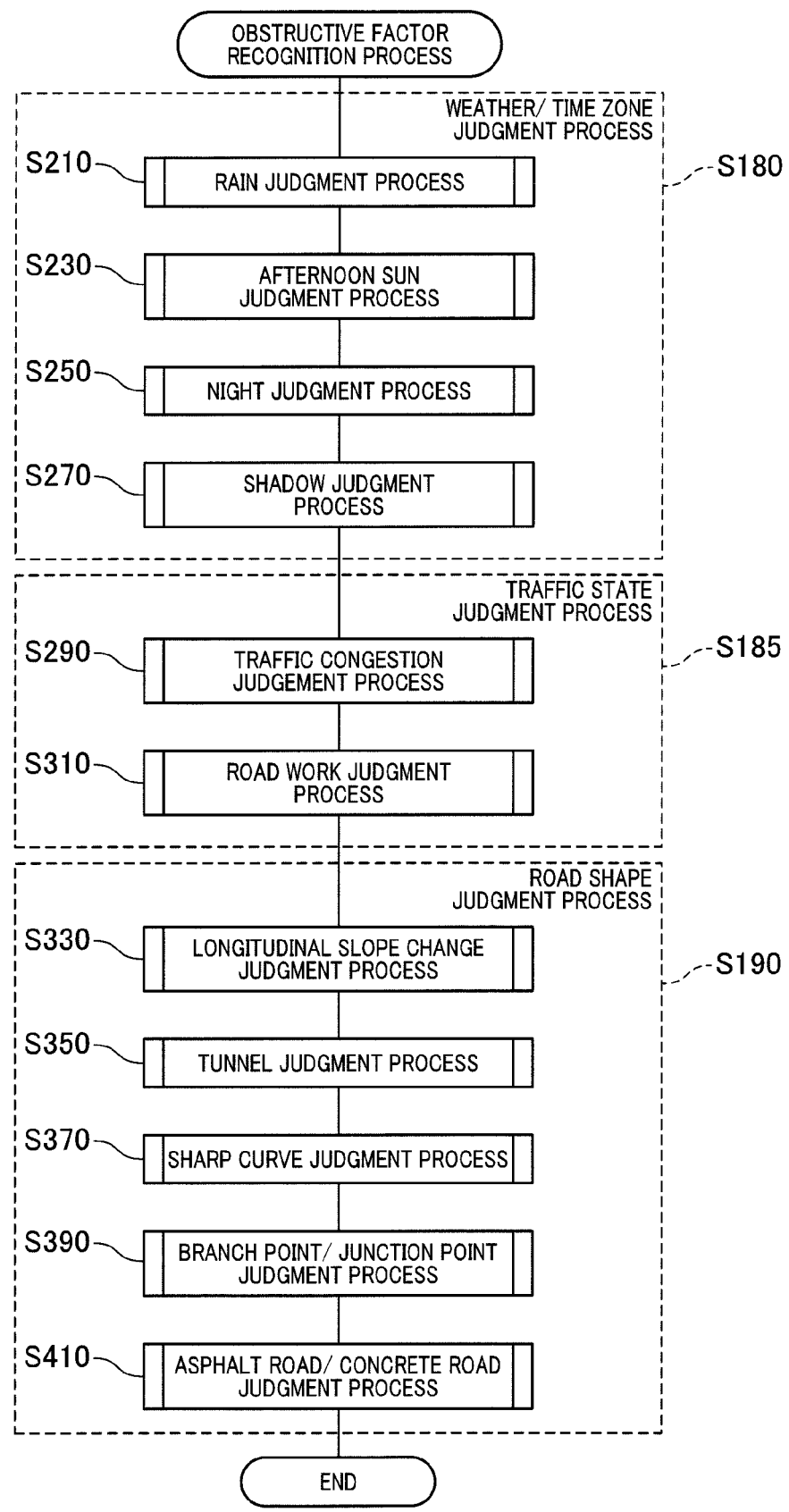
FIG. 3 is a flow chart showing an obstructive factor recognition process S120 in the lane boundary line recognition process according to the exemplary embodiment shown in FIG. 2.

In step S120, the CPU 11 in the processing section 10 performs an obstructive factor recognition process shown in FIG. 3.

FIG. 3 is a flow chart showing the obstructive factor recognition process S120 in the lane boundary line recognition process according to the exemplary embodiment shown in FIG. 2.

The obstructive factor recognition process recognizes factors to decrease the recognition accuracy when a lane boundary line is recognized. As shown in FIG. 3, the CPU 11 in the processing section 10 performs a weather/time zone judgment process S180, a traffic state judgment process S185, and a road shape judgment process S190 in turn during the obstructive factor recognition process. Weighting values are prepared in advance for these processes S180, S185 and S190, respectively and stored in the memory section 12.

In the weather/time zone judgment process S180, the CPU 11 performs a rain judgment section (S210).

Figure 4:
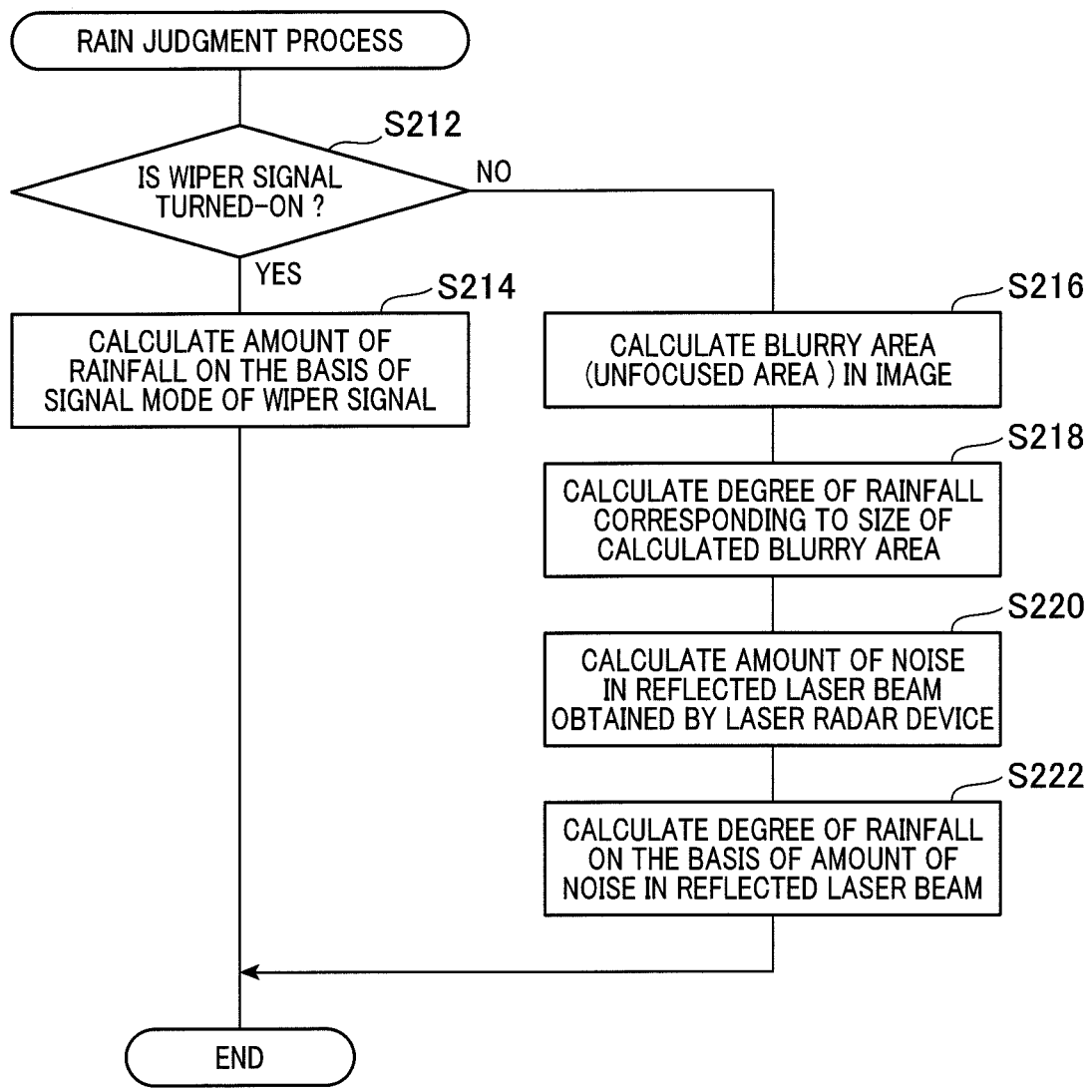
FIG. 4 is a flow chart showing a rain judgment process S210 in a weather/time zone judgment process S180 according to the exemplary embodiment shown in FIG. 3.

FIG. 4 is a flow chart showing the rain judgment process (S210) in the weather/time zone judgment process (step S180) according to the exemplary embodiment shown in FIG. 3.

In the rain judgment section (S210) shown in FIG. 4, the CPU 11 in the processing section 10 receives a wiper signal and judges whether or not the received wiper signal indicates a wiper device can be turned on (step S212).

When the judgment result in step S212 indicates affirmation ("YES" in step S212), the operation flow goes to step S214.

In step S214, the CPU 11 calculates an amount of rainfall (or a strength of rainfall) on the basis of a signal mode of the received wiper signal.

That is, the wiper signal includes an operation mode and a rainfall mode. The operation mode indicates whether or not the wiper device is turned on. The rainfall mode indicates a degree of rainfall such as a highest degree, a lowest degree, or intermittent degree according to a strength (or degree) of rainfall.

In the step S214, the CPU 11 estimates an amount of rainfall on the basis of the rainfall mode in the received wiper signal, and stores the estimated amount of rainfall. The CPU 11 in the processing section 10 completes the rain judgment process S214.

On the other hand, when the judgment result in step S212 indicates negation ("NO" in step S212), the operation flow goes to step S216.

In step S216, the CPU 11 in the processing section 10 calculates a blurry area in an image (as unfocused area in the image). This blurry area indicates an area having a luminosity value which is more than a predetermined luminosity value, having a small difference in luminosity value between adjacent pixels, and is not in focus. The operation flow goes to step S218.

In step S218, the CPU 11 calculates a degree of rainfall corresponding to a size of the calculated blurry area and stores the calculated degree of rainfall into the memory section 12.

The more the size of the calculated blurry area increases, the more the degree of rainfall rises. The operation flow goes to step S220.

In step S220, the CPU 11 calculates an amount of noise in the reflected laser beam which is reflected by an obstacle after the laser radar device 25 irradiates the laser beam. The amount of noise in the reflected laser beam indicates an amount of diffuse reflection of the laser beam by rain. When the amount of rain increases, the more the amount of noise increases. It is therefore possible for the CPU 11 to calculate the degree of rainfall on the basis of the amount of noise in the reflected laser beam. The CPU 11 stores the calculated degree of rainfall into the memory section 12 in step S222.

The CPU 11 calculates a weighted average between the degree of rainfall calculated on the basis of the amount of blurry area and the degree of rainfall calculated on the basis of the amount of noise in the reflected laser beam. The CPU 11 stores the calculated weight average of the degree of rainfall into the memory section 12. The CPU 11 completes the rain judgment process S210 shown in FIG. 4.

Next, the CPU 11 performs the afternoon sun judgment process S230 shown in FIG. 3.

Figure 5:
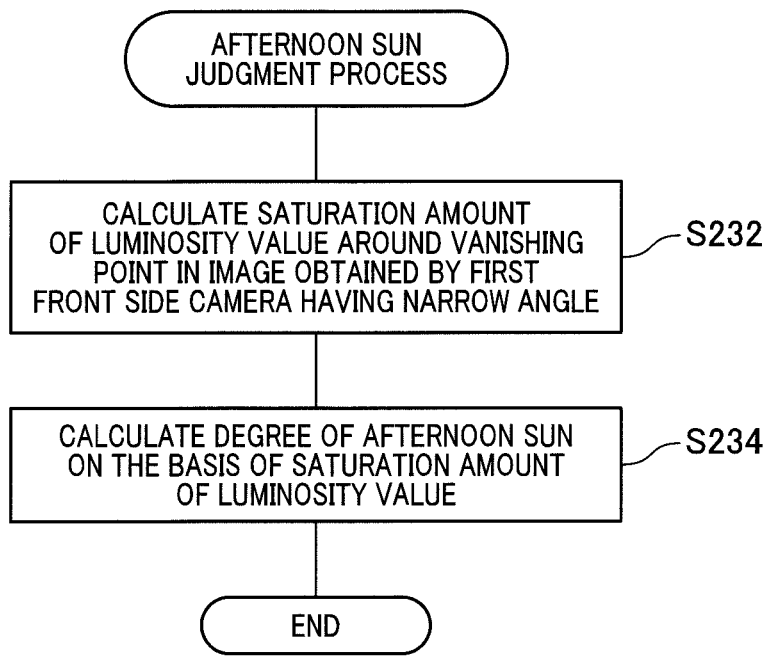
FIG. 5 is a flow chart showing an afternoon sun judgment process S230 in the weather/time zone judgment process S180 according to the exemplary embodiment shown in FIG. 3.

FIG. 5 is a flow chart showing the afternoon sun judgment process S230 in the weather/time zone judgment process S180 according to the exemplary embodiment shown in FIG. 3.

As shown in FIG. 5, the CPU 11 calculates a saturation amount of the surrounding luminosity value of a vanishing point in the image obtained by the first front side camera 21a having a narrow angle in step S232.

Figure 6:
FIG. 6 is a view explaining an exemplary scene which shows an afternoon sun as one of obstructive factors.

FIG. 6 is a view explaining an exemplary scene which shows an afternoon sun as one of obstructive factors.

For example, the vanishing point indicates a predetermined area, which is a central area as indicated with a circle in the image shown in FIG. 6.

When a plurality of white lines is detected in the previous process, it is acceptable to use, as a vanishing point, a crossing point at which the white lines cross to each other.

The saturation amount of the luminosity value indicates the number of pixels, the luminosity value of which has been saturated, in the pixels in the area round the vanishing point in the image. In general, the saturation amount of the luminosity value increases when a light source or an illuminant is present at the vanishing point. The operation flow goes to step S234.

In step S234, the CPU 11 calculates a degree of afternoon sun on the basis of the saturation amount of the luminosity value. The CPU 11 increases the degree of afternoon sun when the saturation amount of the luminosity value increases. The CPU 11 completes the afternoon sun judgment process S230 shown in FIG. 5.

The CPU 11 performs the night judgment process S250 in the weather/time zone judgment process S180 shown in FIG. 3.

Figure 7:
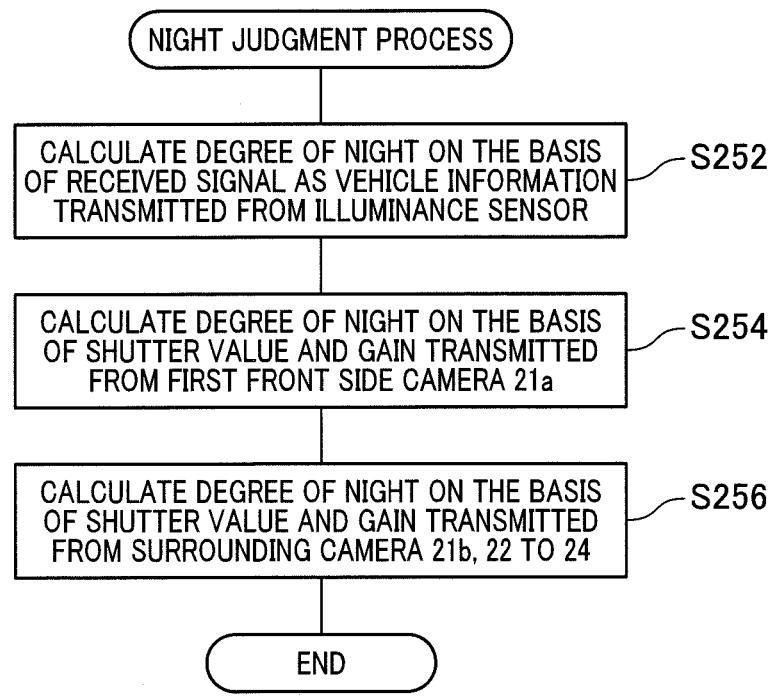
FIG. 7 is a flow chart showing a night judgment process S250 in the weather/time zone judgment process S180 according to the exemplary embodiment shown in FIG. 3.

FIG. 7 is a flow chart showing the night judgment process S250 in the weather/time zone judgment process S180 according to the exemplary embodiment shown in FIG. 3.

In the night judgment process S250 shown in FIG. 7, the processing section 10 receives a detection signal transmitted from an illuminance sensor (not shown), and the CPU 11 calculates a degree of night on the basis of the received signal transmitted from the illuminance sensor (step S252). The operation flow goes to step S254.

In step S254, the processing section 10 receives a shutter value and a gain of the first front side camera 21a having a narrow angle, and the CPU 11 obtains a surrounding brightness on the basis of the calculated shutter value and the gain. The CPU 11 in the processing section 10 calculates the degree of night on the basis of the obtained surrounding brightness. The operation flow goes to step S256.

In step S256, the CPU 11 further calculates the degree of night on the basis of the shutter value and the gain transmitted from each of the surrounding cameras 21b, 22 to 24 which is composed of the second front side camera 21b, the rear side camera 22, the left side camera 23, and the right side camera 24.

The CPU 11 calculates a weighted average of these degrees of night and stores the calculated weighted average into the memory section 12. The CPU 11 completes the night judgment process shown in FIG. 7.

The CPU 11 performs the shadow judgment process (step S270) shown in FIG. 3.

Figure 8:
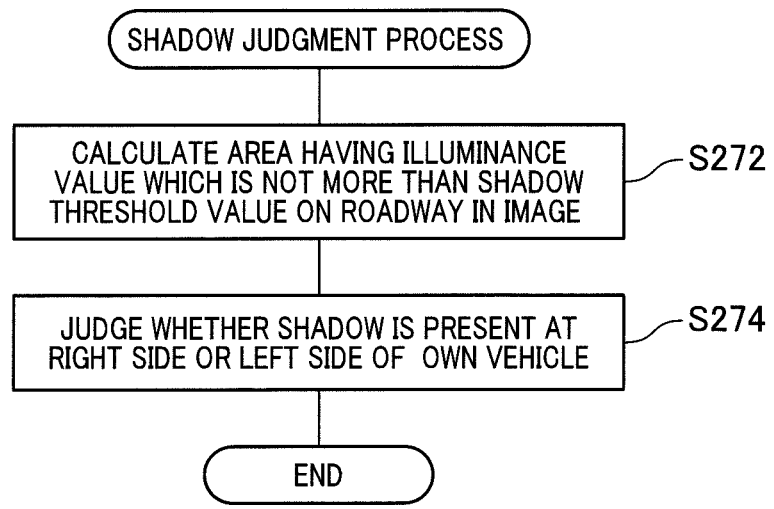
FIG. 8 is a flow chart showing a shadow judgment process S270 in the weather/time zone judgment process S180 according to the exemplary embodiment shown in FIG. 3.

FIG. 8 is a flow chart showing the shadow judgment process S270 in the weather/time zone judgment process S180 according to the exemplary embodiment shown in FIG. 3. In step S272 shown in FIG. 8, the CPU 11 calculates an area having an illuminance value which is not more than a threshold value on a roadway in the image.

Figure 9:
FIG. 9 is a view explaining an exemplary scene which shows a shadow as one of the obstructive factors in image obtained by a first front side camera 21a having a narrow angle.

When there is a shadow on the roadway on which the own vehicle drives, the first front side camera 21a having a narrow angle obtains the image shown in FIG. 9, for example.

FIG. 9 is a view explaining an exemplary scene which shows a shadow as one of the obstructive factors in the image obtained by the first front side camera 21a.

Figure 10:
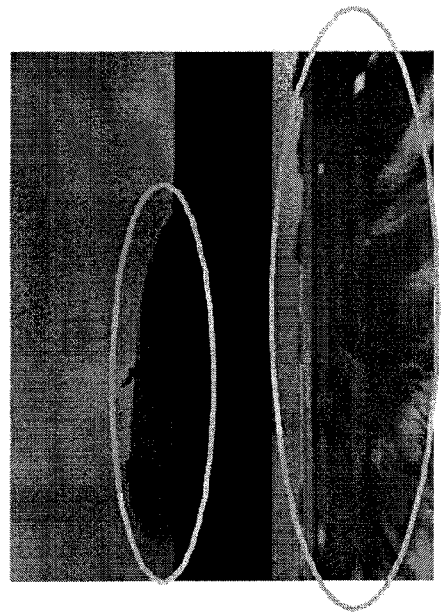
FIG. 10 is a view explaining an exemplary scene which shows a shadow as one of the obstructive factors in images obtained by a left side camera 23 and a right side camera 24 as a part of surrounding cameras.

When there is a shadow on the roadway on which the own vehicle drives, the left side camera 23 and the right side camera 24 obtain the image shown in FIG. 10, for example.

FIG. 10 is a view explaining an exemplary scene which shows a shadow as one of the obstructive factors in the images obtained by the left side camera 23 and the right side camera 24.

It can be clearly recognized that a lane white line becomes dark and gradually disappeared due to the presence of shadow in the obtained image shown in FIG. 9 and the obtained image shown in FIG. 10. The operation flow goes to step S274.

In step S274, the CPU 11 in the processing section 10 judges whether the shadow is present at the right side or the left side of the own vehicle. That is, the CPU 11 determines the area having the shadow which has a larger area having the illuminance value of not more than the shadow threshold value in a left half area and a right half area in the image. The CPU 11 stores the determined area, i.e. one of the left half area and the right half area having the large area in the image into the memory section 12.

The CPU 11 in the processing section 10 completes the shadow judgment process (S270) shown in FIG. 8.

Next, the CPU 11 performs the traffic congestion judgment process S290 in the traffic state judgment process S185 shown in FIG. 3.

Figure 11:
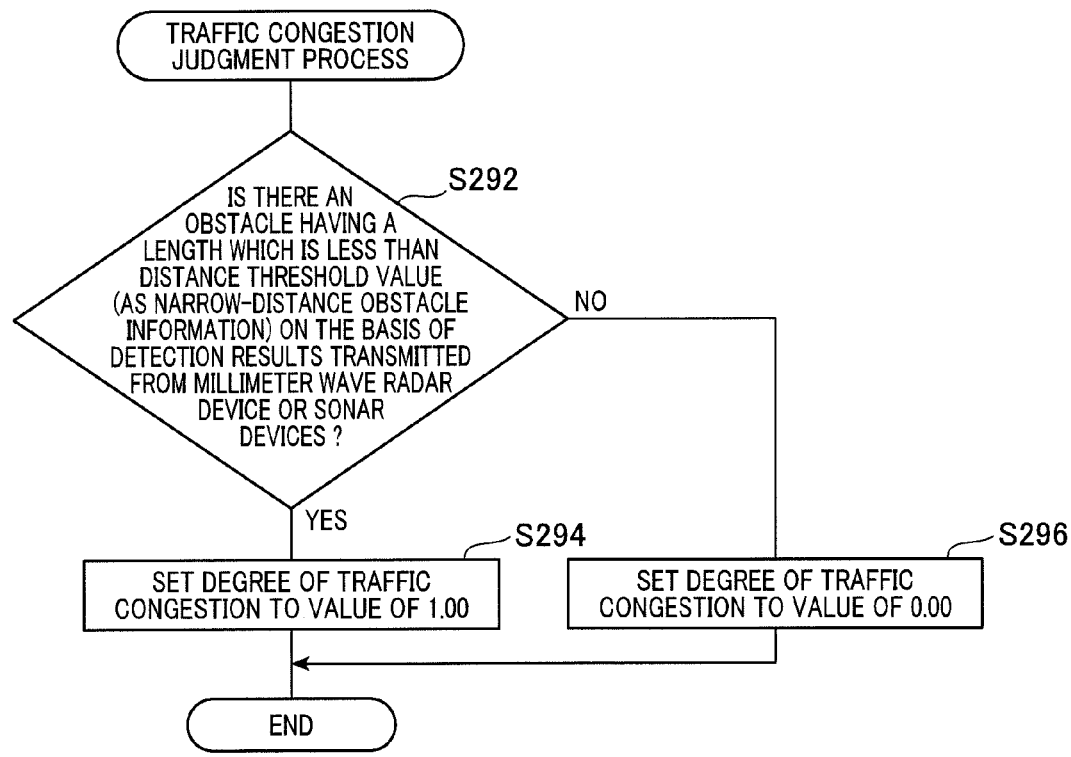
FIG. 11 is a flow chart showing a traffic congestion judgment process S290 in the traffic state judgment process S185 according to the exemplary embodiment shown in FIG. 3.

FIG. 11 is a flow chart showing the traffic congestion judgment process S290 in the traffic state judgment process S185 according to the exemplary embodiment shown in FIG. 3.

In the traffic congestion judgment process S290 shown in FIG. 11, the CPU 11 judges whether or not there is an obstacle such as a vehicle ahead having a length which is less than a distance threshold value (as narrow-distance obstacle information) on the basis of the detection results transmitted from the millimeter wave radar device 26 or the sonar devices 27 (in step S292).

Figure 12:
FIG. 12 is a view explaining an exemplary scene which shows a traffic congestion as one of the obstructive factors.

FIG. 12 is a view explaining an exemplary scene which shows occurrence of a traffic congestion as one of the obstructive factors.

As shown in FIG. 12, when a traffic congestion occurs, a distance between the own vehicle and the vehicle ahead becomes relatively narrow. That is, the CPU 11 generates the narrow-distance obstacle information. In this case, it becomes difficult for the driver of the own vehicle to recognize a lane white line because the lane white line is hidden by the surrounding vehicles of the own vehicle.

When the judgment result in step S292 indicates affirmation ("YES" in step S292), the operation flow goes to step S294.

In step S294, the CPU 11 sets the degree of traffic congestion to a value of 1.00. The CPU 11 completes the traffic congestion judgment process S290.

On the other hand, when the judgment result in step S292 indicates negation ("NO" in step S292), the operation flow goes to step S296.

In step S296, the CPU 11 sets the degree of traffic congestion to a value of 0.00. The CPU 11 completes the traffic congestion judgment process S290.

It is possible for the CPU 11 in the processing section 10 to calculate the degree of traffic congestion on the basis of the traffic information transmitted from the traffic information receiving section 35 or a combination of the traffic information transmitted from the traffic information receiving section 35 and the detection result transmitted form the millimeter wave radar device 26 or the sonar devices 27.

Next, the CPU 11 performs the road work judgment process S310 in the traffic state judgment process S185 shown in FIG. 3.

Figure 13:
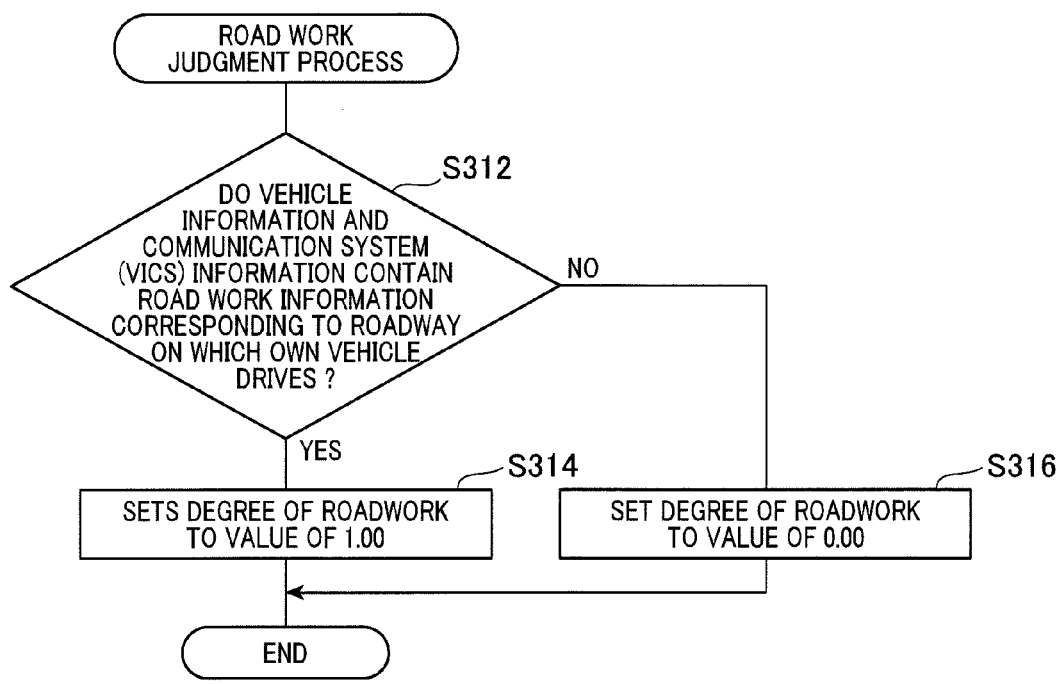
FIG. 13 is a flow chart showing a road work judgment process S310 in the traffic state judgment process S185 according to the exemplary embodiment shown in FIG. 3.

FIG. 13 is a flow chart showing the road work judgment process S310 in the traffic state judgment process S185 according to the exemplary embodiment shown in FIG. 3.

In the road work judgment process S310 shown in FIG. 13, the CPU 11 judges whether or not there is any Vehicle Information and Communication System (VICS) information that contains road work information corresponding to the roadway on which the own vehicle drives (step S312). The VICS is a trademark.

When the judgment result indicates affirmation ("YES" in step S312), i.e. that the received VICS information contains road work information of the roadway, the operation flow goes to step S314.

In step S314, the CPU 11 sets the degree of roadwork to a value of 1.00. The CPU 11 completes the road work judgment process S310.

On the other hand, when the judgment result in step S312 indicates negation ("NO" in step S312), the operation flow goes to step S316.

In step S316, the CPU 11 sets the degree of road work to a value of 0.00. The CPU 11 completes the road work judgment process S310.

Next, the CPU 11 in the processing section 10 performs the longitudinal slope change judgment process S330 in the road shape judgment process S190 shown in FIG. 3.

Figure 14:
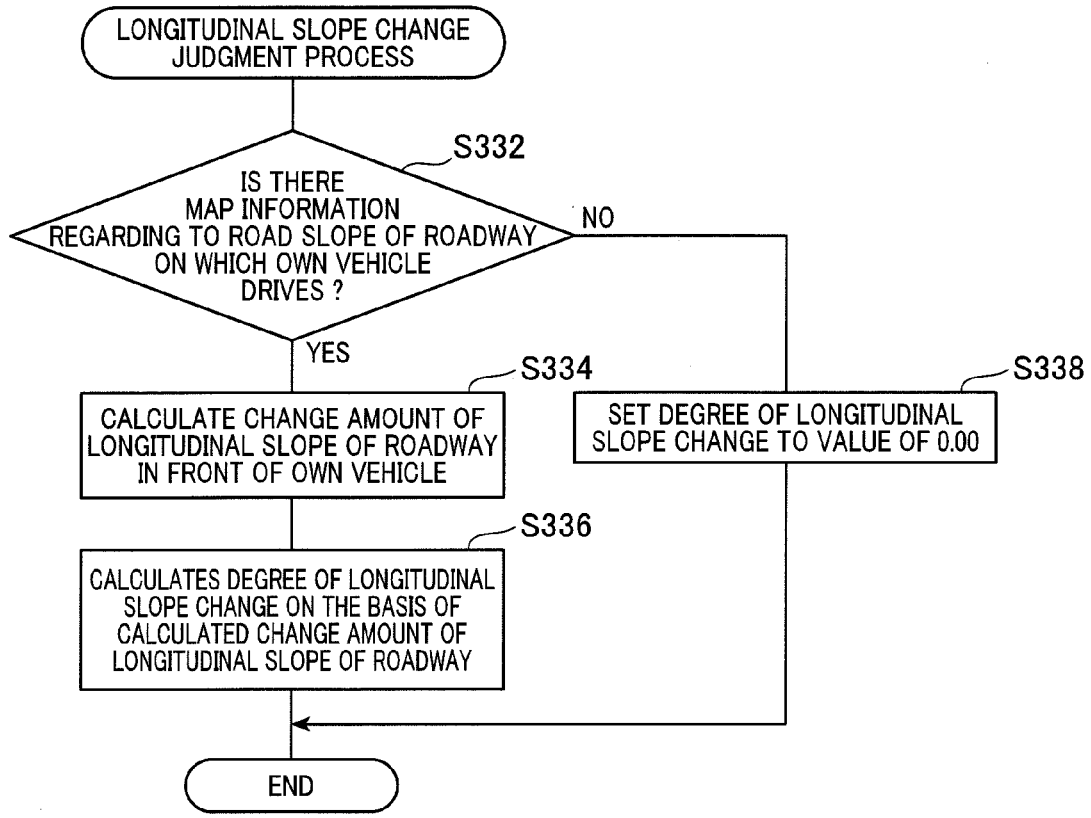
FIG. 14 is a flow chart showing a longitudinal slope change judgment process S330 in a road shape judgment process S190 according to the exemplary embodiment shown in FIG. 3.

FIG. 14 is a flow chart showing the longitudinal slope change judgment process S330 in the road shape judgment process S190 according to the exemplary embodiment shown in FIG. 3.

As shown in FIG. 14, the CPU 11 performs the longitudinal slope change judgment process S330. That is, the CPU 11 judges whether or not there is map information, in particular, regarding to a road slope of the roadway on which the own vehicle drives (step S332).

When the judgment result indicates affirmation ("YES" in step S332), i.e. there is the map information, the operation flow goes to step S334.

In step S334, the CPU 11 calculates a change amount of a longitudinal slope of the roadway in front of the own vehicle. The operation flow goes to step S336.

In step S336, the CPU 11 calculates a degree of the longitudinal slope change on the basis of the calculated change amount of the longitudinal slope of the roadway.

On the other hand, when the judgment result indicates negation "NO" is step S332, the operation flow goes to step S338.

In step S338, the CPU 11 sets the degree of the longitudinal slope change to a value of 0.00.

The change amount of a longitudinal slope of a roadway indicates a degree of a longitudinal slope in uphill direction or a downhill direction of the roadway.

Figure 15:
FIG. 15 is a view explaining an exemplary scene which shows a longitudinal slope change as one of the obstructive factors.

FIG. 15 is a view explaining an exemplary scene which shows a change of a longitudinal slope of a roadway as one of the obstructive factors. As shown in FIG. 15, when the CPU 11 performs the lane white line recognition process, which will be explained later, by using an upper limit of a white line recognition area in order to recognize a lane white line in image.

The CPU 11 completes the longitudinal slope change judgment process S330 shown in FIG. 14.

The CPU 11 in the processing section 10 performs the tunnel judgment process S350 in the road shape judgment process S190 shown in FIG. 3.

Figure 16:
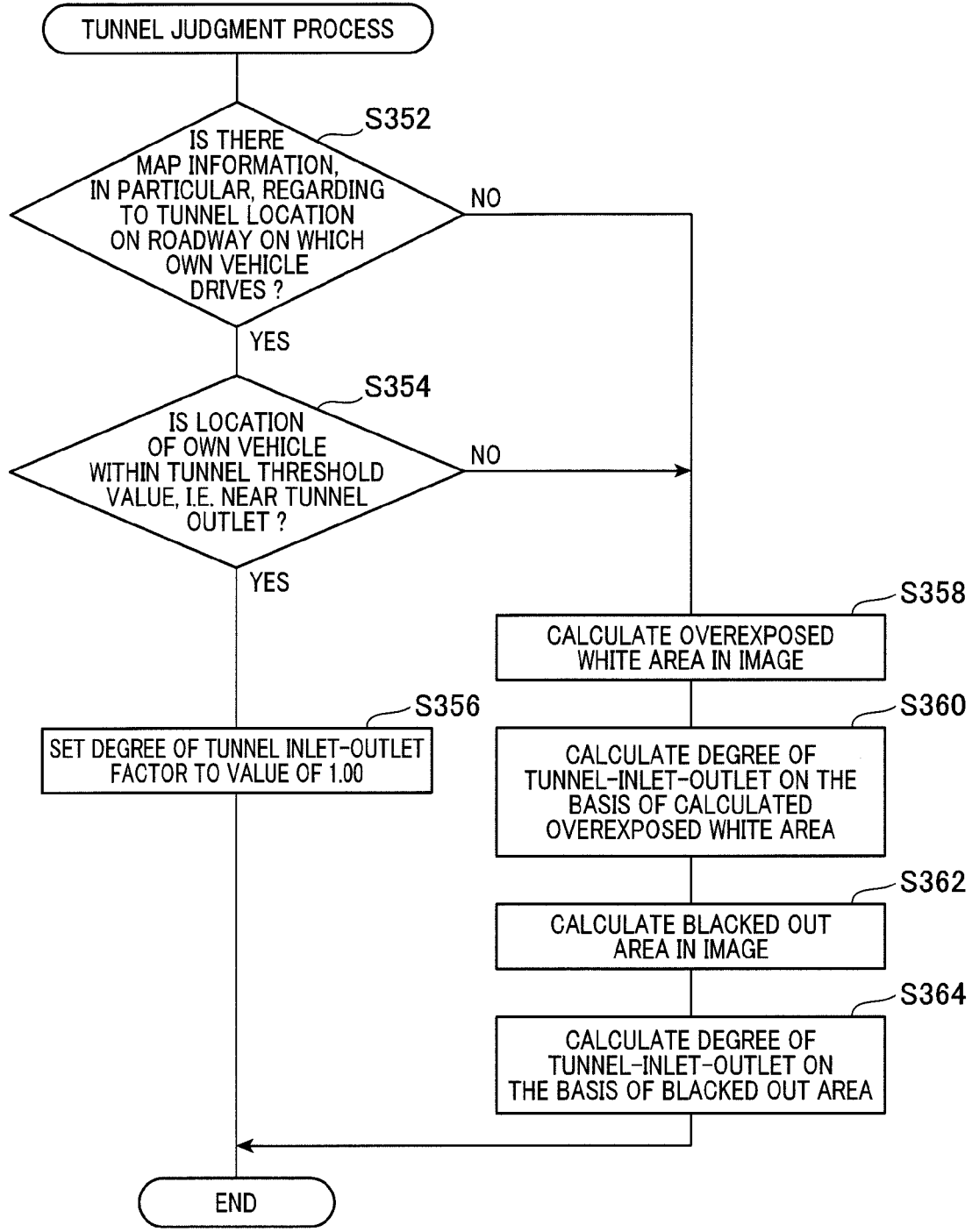
FIG. 16 is a flow chart showing a tunnel judgment process S350 in the road shape judgment process S190 according to the exemplary embodiment shown in FIG. 3.

FIG. 16 is a flow chart showing the tunnel judgment process S350 in the road shape judgment process S190 according to the exemplary embodiment shown in FIG. 3.

In step S352 in the tunnel judgment process S350 shown in FIG. 16, the CPU 11 judges whether or not there is map information, in particular, regarding to a tunnel location on the roadway on which the own vehicle drives.

When the judgment result in step S352 indicates affirmation ("YES" in step S352), i.e. there is map information regarding a tunnel location, the operation flow goes to step S354.

In step S354, the CPU 11 judges whether or not the location of the own vehicle is within a tunnel threshold value (which indicates that the location of the own vehicle is near the tunnel inlet or a tunnel outlet). The operation flow goes to step S354.

When the judgment result in step S354 indicates affirmation ("YES" in step S354), i.e. indicates that the location of the own vehicle is near a tunnel inlet or a tunnel outlet, the operation flow goes to step S356.

In step S356, the CPU 11 sets a degree of a tunnel inlet-outlet factor to a value of 1.00. The degree of the tunnel inlet-outlet factor indicates a degree of influence from a brightness in a tunnel inlet or a tunnel outlet. The CPU 11 completes the tunnel judgment process S350.

On the other hand, when the judgment result in step S354 indicates negation ("NO" in step S354) or when the judgment result in step S352 indicates negation ("NO" in step S352), i.e. there is no map information, the operation flow goes to step S358.

In step S358, the CPU 11 calculates an overexposed white area in the image obtained by the first front side camera 21a.

This overexposed white area indicates a white area in which each pixel has a saturated illuminance value in the image.

Figure 17:
FIG. 17 is a view explaining an exemplary scene which shows a tunnel outlet as one of the obstructive factors.

FIG. 17 is a view explaining an exemplary scene which shows a tunnel outlet as one of the obstructive factors.

As shown in FIG. 17, the tunnel outlet area have pixels having extremely high illuminance values which is referred as the overexposed white area. The operation flow goes to step S360.

In step S360, the CPU 11 in the processing section 10 calculates the degree of tunnel-inlet-outlet on the basis of the calculated overexposed white area. That is, the CPU 11 increases the degree of tunnel-inlet-outlet according to the increasing of the overexposed white area. The operation flow goes to step S362.

In step S362, the CPU 11 calculates a blacked out area in the image obtained by the first front side camera 21a.

Each pixel in the blacked out area has an illuminance value of approximately zero, and approximately a black color.

Figure 18:
FIG. 18 is a view explaining an exemplary scene which shows a tunnel inlet as one of the obstructive factors.

FIG. 18 is a view explaining an exemplary scene which shows a tunnel inlet as one of the obstructive factors.

As shown in FIG. 18, the tunnel inlet area is the blacked out area which is a dark area as compared with the other area in the image. The operation flow goes to step S364.

In step S364, the CPU 11 calculates the degree of tunnel-inlet-outlet on the basis of the blacked out area. That is, the more the blacked out area increases, the more the degree of tunnel-inlet-outlet rises.

Further, the CPU 11 elects the degree of tunnel-inlet-outlet having a higher calculated value in the calculated degree of tunnel-inlet-outlet obtained by using the overexposed white area and the calculated degree of tunnel-inlet-outlet obtained by using the blacked out area. The CPU 11 completes the tunnel judgment process S350.

The CPU 11 performs the sharp curve judgment process S370 in the road shape judgment process S190 shown in FIG. 3.

Figure 19:
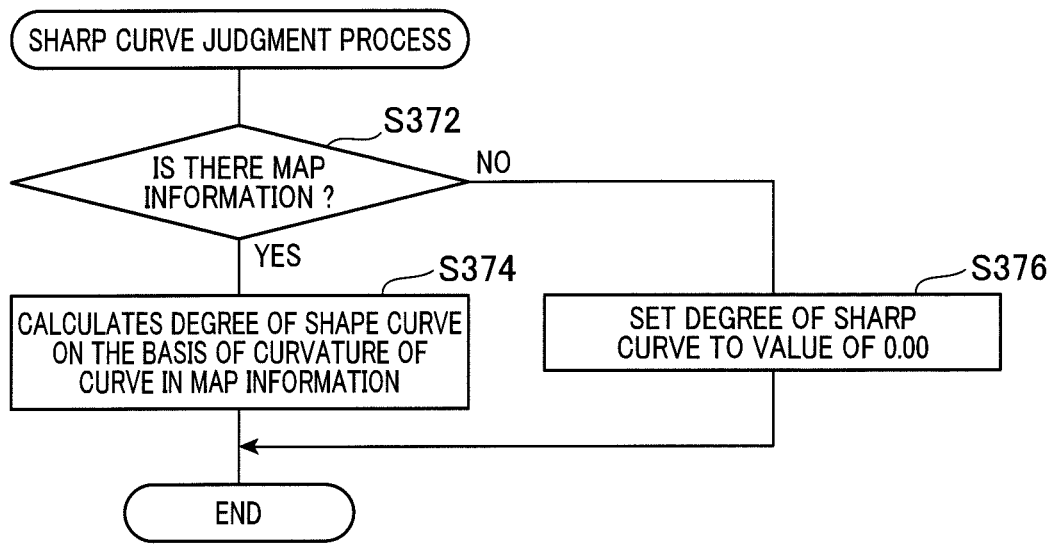
FIG. 19 is a flow chart showing a sharp curve judgment process S370 in the road shape judgment process S190 shown in FIG. 3.

FIG. 19 is a flow chart showing the sharp curve judgment process S370 in the road shape judgment process S190 shown in FIG. 3.

In step S372 in the sharp curve judgment process S370 shown in FIG. 19, the CPU 11 judges whether or not there is map information, in particular, regarding to a curvature of a curve.

When the judgment result in step S372 indicates affirmation ("YES" in step S372), i.e. there is the map information regarding a curvature of a curve on the roadway on which the own vehicle drives, the operation flow goes to step S374.

In step S374, the CPU 11 calculates a degree of a sharp curve on the basis of a radius of curvature in the map information. The degree of the sharp curve increases according to the decreasing of the radius of curvature. The CPU 11 completes the sharp curve judgment process S370.

When the judgment result in step S372 indicates negation ("NO" in step S372), i.e. there is no map information regarding a curvature of a curve on the roadway on which the own vehicle drives, the operation flow goes to step S376.

In step S376, the CPU 11 sets the degree of the sharp curve to a value of 0.00 which indicates there is no curve on the roadway or there is no information regarding a curve.

Next, the CPU 11 performs the branch point/junction point judgment process S390 in the road shape judgment process S190 shown in FIG. 3.

Figure 20:
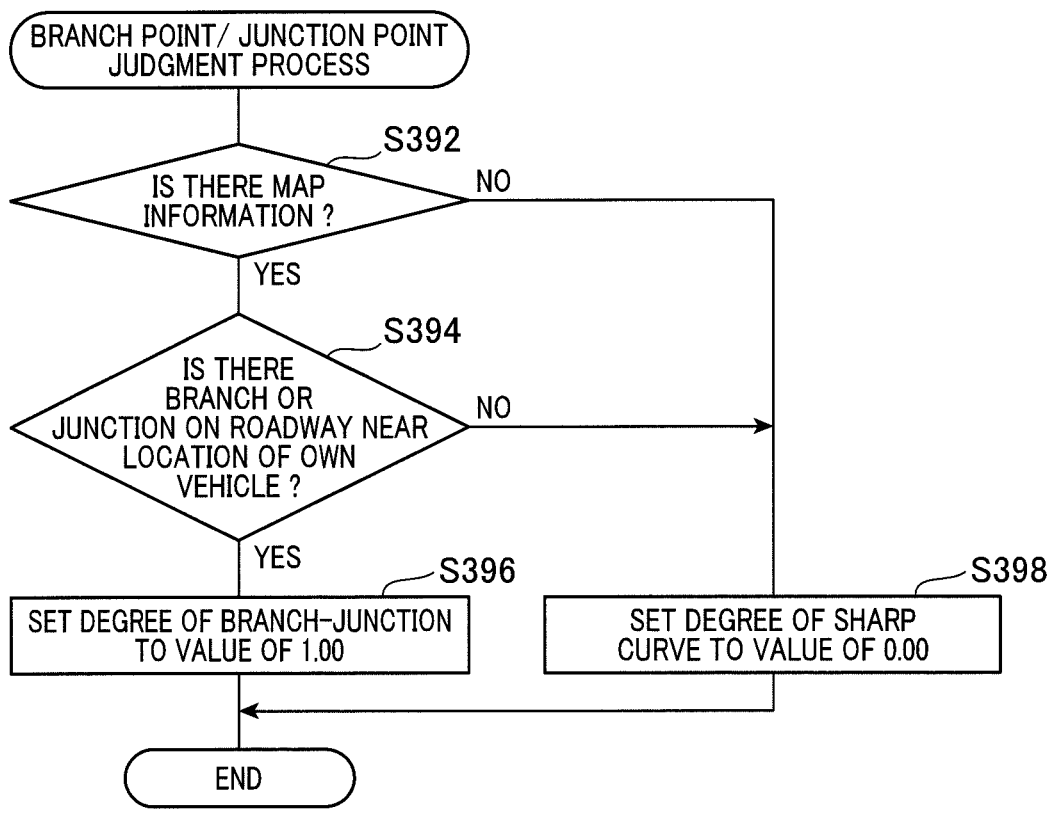
FIG. 20 is a flow chart showing a branch point/junction point judgment process S390 in the road shape judgment process S190 according to the exemplary embodiment shown in FIG. 3.

FIG. 20 is a flow chart showing the branch point/junction point judgment process S390 in the road shape judgment process S190 according to the exemplary embodiment shown in FIG. 3.

In step S392 shown in FIG. 20, the CPU 11 judges whether or not there is map information, in particular, map information regarding a branch point, a junction point, an intersection point on the roadway on which the own vehicle drives.

When the judgment result in step S392 indicates affirmation ("YES" in step S392), i.e. there is map information regarding information regarding a branch point, a junction point, an intersection point on the roadway on which the own vehicle drives, the operation flow goes to step S394.

In step S394, the CPU 11 judges whether or not there is a branch point or a junction point on the roadway near the location of the own vehicle. When the judgment result in step S394 indicates affirmation ("YES" in step S394), i.e.

there is a branch point or a junction point on the roadway near the location of the own vehicle, the operation flow goes to step S396.

In step S396, the CPU 11 sets a degree of branch-junction to a value of 1.00. The CPU 11 completes the branch point/junction point judgment process S390 shown in FIG. 20.

On the other hand, when the judgment result in step S392 indicates negation ("NO" in step S392), i.e. there is no map information regarding a branch point or a junction point on the roadway on which the own vehicle drives, or when the judgment result in step S394 indicates negation ("NO" in step S394), i.e. there is no information regarding a branch point or a junction point, the operation flow goes to step S398.

In step S398, the CPU 11 sets the degree of branch-junction to a value of 0.00 which indicates there is no information regarding a branch or a junction. The CPU 11 completes the branch point/junction point judgment process S390 shown in FIG. 20.

Next, the CPU 11 performs the asphalt road/concrete road judgment process S410 in the road shape judgment process S190 shown in FIG. 3.

Figure 21:
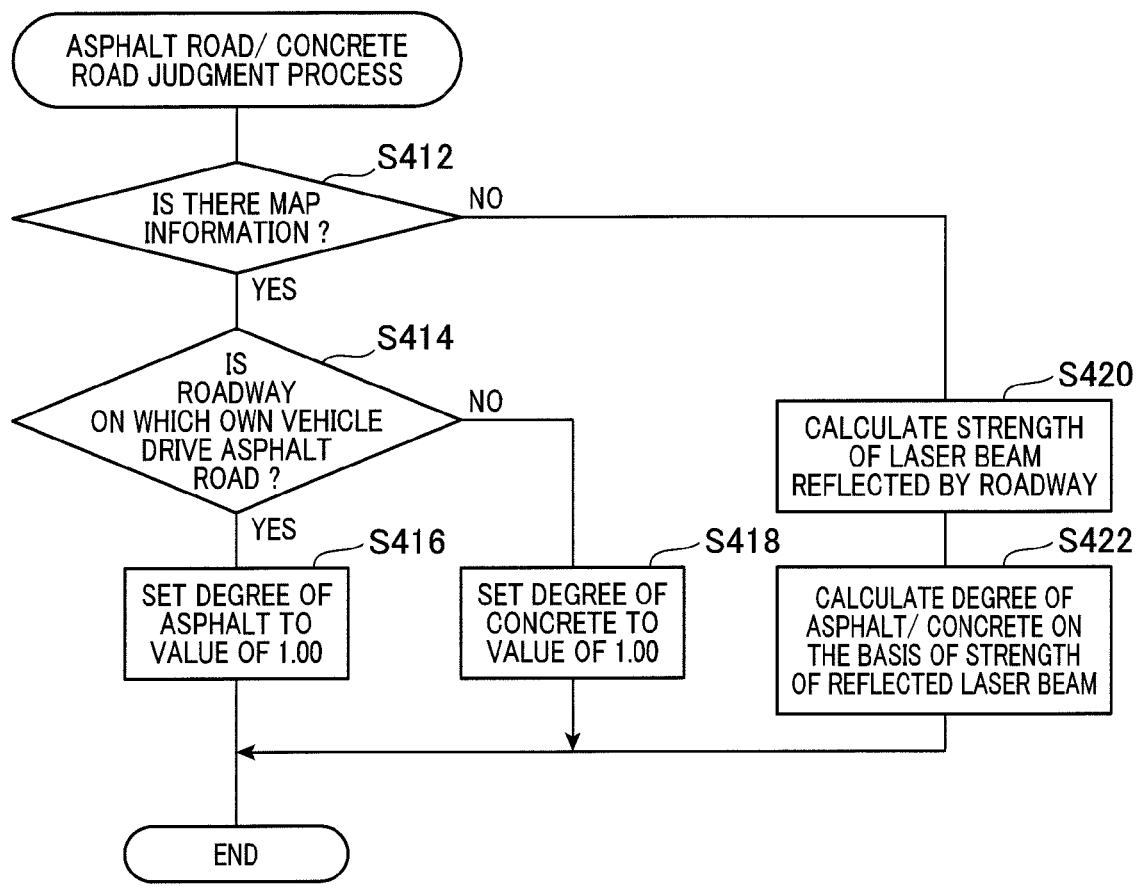
FIG. 21 is a flow chart showing an asphalt road/concrete road judgment process S410 in the road shape judgment process S190 according to the exemplary embodiment shown in FIG. 3.

FIG. 21 is a flow chart showing the asphalt road/concrete road judgment process S410 in the road shape judgment process S190 according to the exemplary embodiment shown in FIG. 3.

In step S412 shown in FIG. 21, the CPU 11 judges whether or not there is map information, in particular, map information regarding surface material of the roadway on which the own vehicle drives.

When the judgment result in step S412 indicates affirmation ("YES" in step S412), i.e. there is the map information regarding surface material of the roadway, the operation flow goes to step S414.

In step S414, the CPU 11 judges whether or not the roadway on which the own vehicle drives is an asphalt road on the basis of the map information.

When the judgment result in step S414 indicates affirmation ("YES" in step S414), i.e. the roadway is an asphalt road on which the own vehicle drives, the operation flow goes to step S416.

In step S416, the CPU 11 sets a degree of asphalt road to a value of 1.00. The CPU 11 completes the asphalt road/concrete road judgment process S410 shown in FIG. 21.

On the other hand, when the judgment result in step S414 indicates negation ("NO" in step S414), i.e. the roadway is not an asphalt road, the operation flow goes to step S418.

In step S418, the CPU 11 sets the degree of asphalt road to a value of 1.00. The CPU 11 completes the asphalt road/concrete road judgment process S410 shown in FIG. 21.

Further, when the judgment result in step S412 indicates negation ("NO" in step S412), i.e. there is no map information, the operation flow goes to step S420.

In step S420, the CPU 11 calculates a strength of laser beam reflected by the surface of the roadway on which the own vehicle drives. The operation flow goes to step S422.

In step S422, the CPU 11 calculates a degree of asphalt or a degree of concrete on the basis of the strength of the reflected laser beam.

The more the strength of the reflected laser beam increases, the more the degree of concrete increases, and the more the degree of asphalt decreases. The more the strength of the reflected laser beam decreases, the more the degree of concrete decreases, and the more the degree of asphalt increases.

The CPU 11 completes the asphalt road/concrete road judgment process S410.

Next, the CPU 11 performs the white line judgment process S130 in the lane boundary line recognition process shown in FIG. 2.

Figure 22:
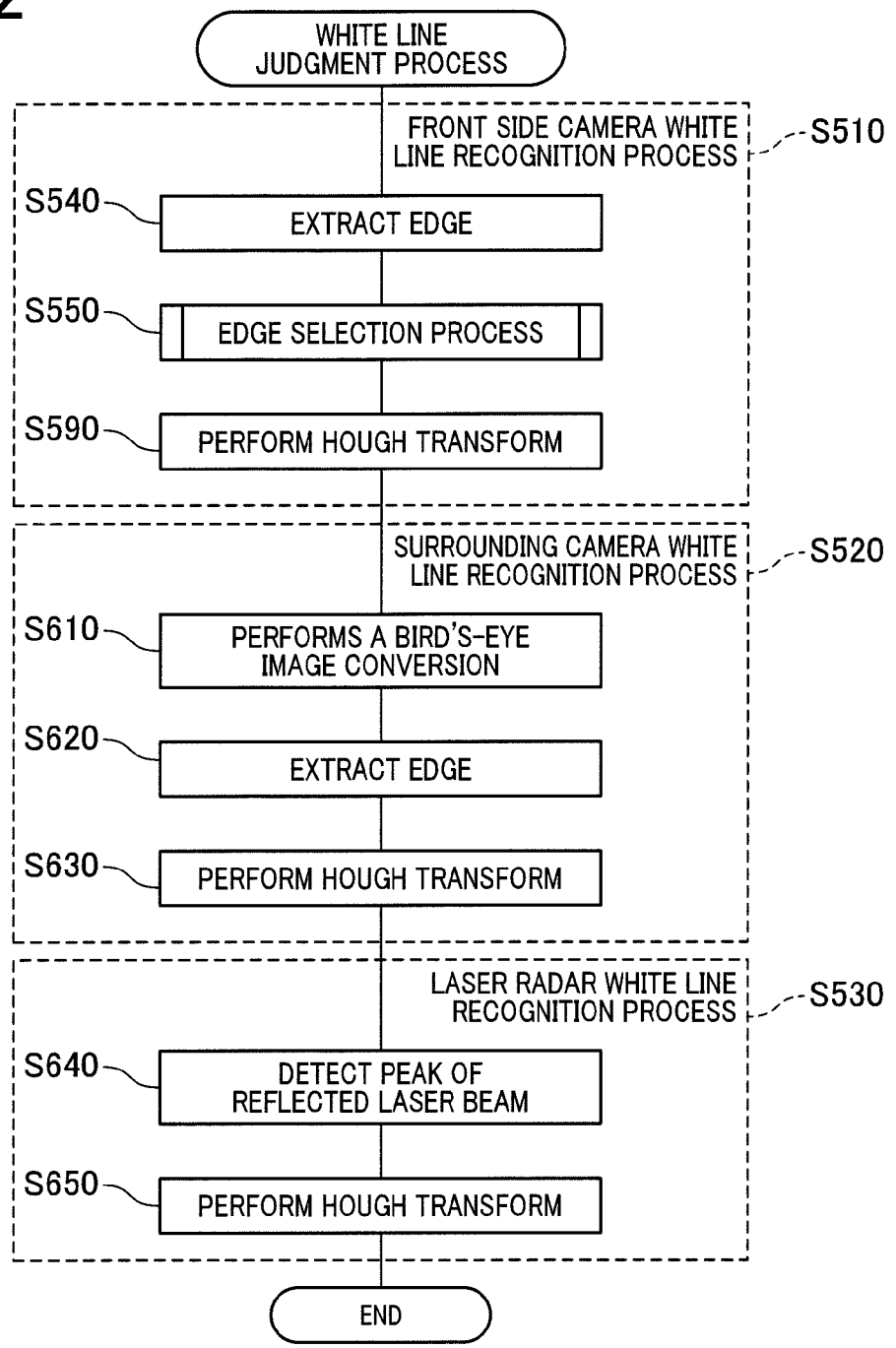
FIG. 22 is a flow chart showing a white line judgment process S130 in the lane boundary line recognition process according to the exemplary embodiment shown in FIG. 2.

FIG. 22 is a flow chart showing the white line judgment process S130 in the lane boundary line recognition process according to the exemplary embodiment shown in FIG. 2.

The white line judgment process S130 detects and recognizes a lane white line on the roadway by using different optical detection methods.

In order to recognize a lane white line on the roadway on which the own vehicle drives, the CPU 11 performs a front side camera white line recognition process S510, a surrounding camera white line recognition process S520, and a laser radar white line recognition process S530 in turn.

In the front side camera white line recognition process S510, the CPU 11 recognizes a presence of a lane white line on the roadway on which the own vehicle drives on the basis of the image obtained by the first front side camera 21a.

As shown in FIG. 22, the asphalt road extracts edges in a white line recognition area in the image obtained by the first front side camera 21a (Step S540). This white line recognition area is an area, in a predetermined area on the image, which has been compensated on the basis of map information (regarding a road grade or a road gradient of the roadway and a curvature of the roadway). The edge indicates a position at which a difference in illuminance value adjacent pixels is larger than a reference value.

The CPU 11 performs the edge selection process S550 in the front side camera white line recognition process S510.

In the edge selection process S550 in the front side camera white line recognition process S510, the CPU 11 detects whether or not an edge is effective or ineffective (valid or invalid) on the basis of an edge obtained from the image detected by the first front side camera 21a having a narrow angle and a reflected laser beam obtained by the laser radar device 25.

Figure 23:
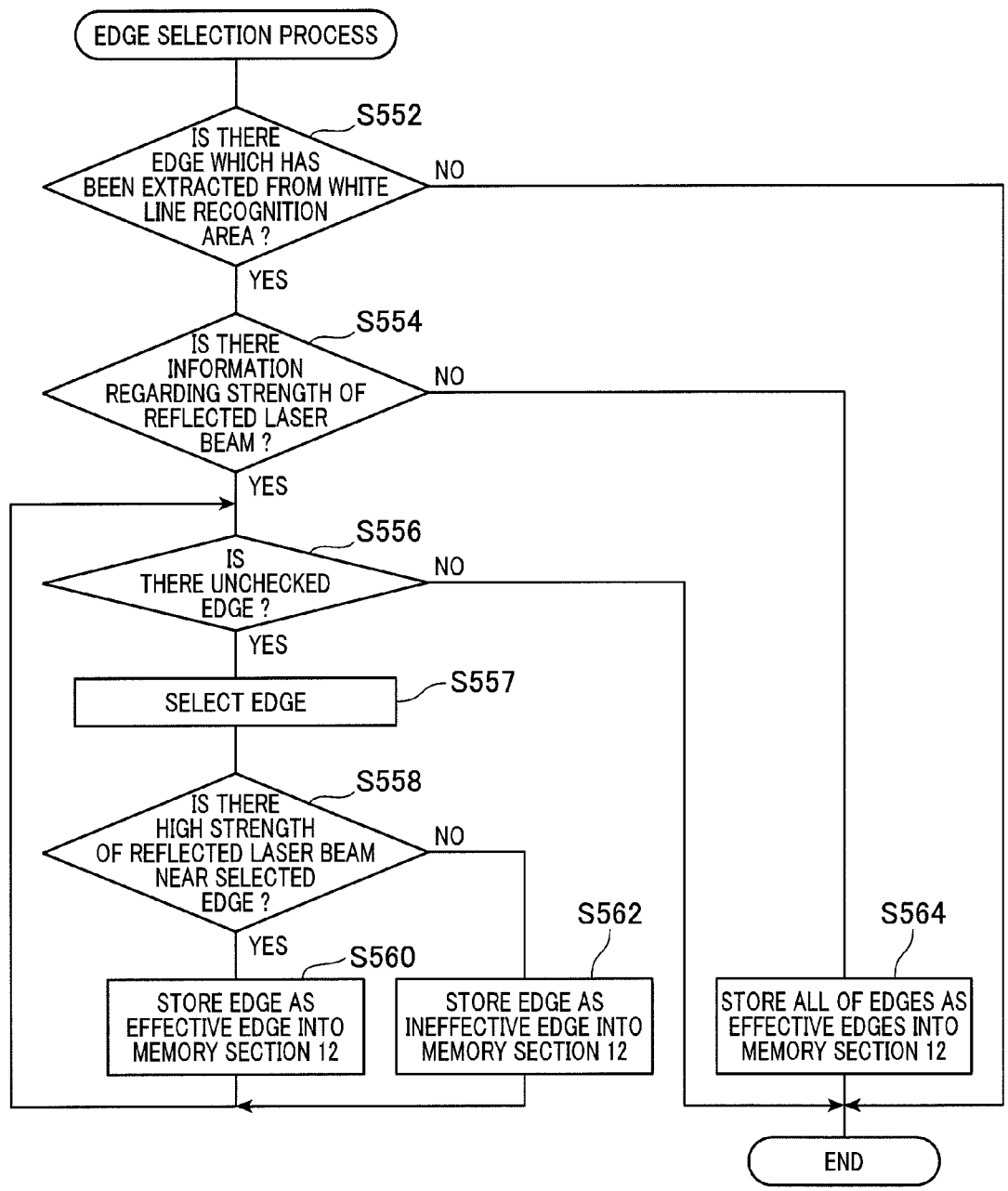
FIG. 23 is a flow chart showing an edge selection process S550 in a front side camera white line recognition process S510 in the white line judgment process S130 according to the exemplary embodiment shown in FIG. 2.

FIG. 23 is a flow chart showing the edge selection process S550 in the front side camera white line recognition process S510 in the white line judgment process S130 according to the exemplary embodiment shown in FIG. 2.

In the edge selection process S550 shown in FIG. 23, the CPU 11 detects whether or not there is an edge which has been extracted from the white line recognition area (S552).

When the detection result in step S552 indicates negation ("NO" in step S552), i.e. no edge is extracted, the CPU 11 in the processing section 10 completes the edge selection process S550 shown in FIG. 23.

On the other hand, when the detection result in step S552 indicates affirmation ("YES" in step S552), i.e. at least an edge has been extracted, the operation flow goes to step S554.

In step S554, the CPU 11 detects whether or not there is information regarding a strength of the reflected laser beam obtained by the laser radar device 25.

When the detection result in step S554 indicates negation ("NO" in step S554), i.e. there is no information regarding the strength of the reflected laser beam, the operation flow goes to step S564.

In step S564, the CPU 11 determines all of the detected edges are effective (valid) and stores those effective edges into the memory section 12. The CPU 11 completes the edge selection process S550 shown in FIG. 23.

On the other hand, when the detection result in step S554 indicates affirmation ("YES" in step S554), i.e. there is information regarding the reflected laser beam, the operation flow goes to step S556.

In step S556, the CPU 11 detects whether or not there are any unchecked edges.

The unchecked edge is an edge which is not selected in the step S557.

When the detection result in step S556 indicates negation ("NO" in step S556), i.e. there is no unchecked edge, the CPU 11 completes the edge selection process S550 shown in FIG. 23.

On the other hand, when the detection result in step S556 indicates affirmation ("YES" in step S556), i.e. there is an unchecked edge, the operation flow goes to step S557.

In step S557, the CPU 11 selects the unchecked edge or one of unchecked edges. The operation flow goes to step S558.

In step S558, the CPU 11 judges whether or not there is a high strength of the reflected laser beam obtained by the laser radar device 25 near the selected edge, for example, within several pixels in the image.

When the detection result in step S558 indicates affirmation ("YES" in step S558), the operation flow goes to step S560.

In step S560, the CPU 11 stores this edge as an effective edge into the memory section 12. The operation flow is returned to step S556.

On the other hand, when the detection result in step S558 indicates negation ("NO" in step S558), the operation flow goes to step S562.

In step S562, the CPU 11 stores the edge as the ineffective edge into the memory section 12.

In the edge selection process S550 shown in FIG. 23 previously described, the CPU 11 in the processing section 10 judges that the white line, which has been recognized in the image detected by the first front side camera 21a and not been recognized by the laser radar device 25, is not a white line.

Figure 24:
FIG. 24 is a view explaining an exemplary scene which shows coal tar as one of the obstructive factors.
Figure 25:
FIG. 25 is a view explaining a bird-eyes view as one of images obtained by the surrounding cameras 21b to 24 when coal tar is on a roadway.

FIG. 24 is a view explaining an exemplary scene which shows coal tar as one of the obstructive factors. FIG. 25 is a view explaining a bird-eyes view as one of images obtained by the surrounding cameras 21b to 24 when a surface of the roadway is covered with coal tar or coal tar based material.

That is, as shown in FIG. 24 and FIG. 25, when the roadway is covered with light reflecting material such as coal tar, there is a possible incorrect recognition in which the first front side camera 21a or the surrounding cameras 21b, 22 to 24 recognize coal tar on the roadway as a white line because coal tar reflects sun light.

Figure 26:
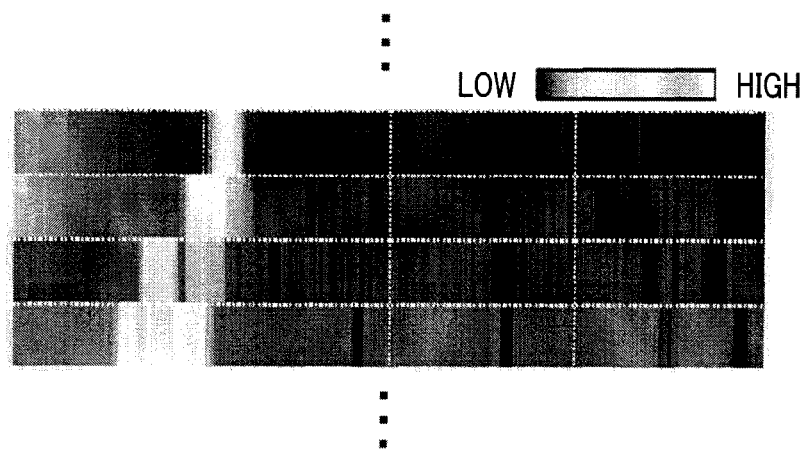
FIG. 26 is a view explaining an exemplary scene which shows a strength of reflected laser beam emitted from a laser radar device 25 when coal tar is on a roadway.

FIG. 26 is a view explaining an exemplary scene which shows a strength of reflected laser beam obtained by the laser radar device 25 when coal tar is on a roadway.

As shown in FIG. 26, the laser radar device 25 does not recognize coal tar. Accordingly, it is possible for the laser radar device 25 to obtain a correct recognition of detecting coal tar on a road way even if the first front side camera 21a or the surrounding cameras 21b, 22 to 24 recognize coal tar as a white line or a lane white line.

When completing the edge selection process S550 shown in FIG. 23, the CPU 11 performs the Hough transform in step S590. The Hough transform is a feature extraction technique used in image analysis, computer vision, and digital image processing. The purpose of the Hough transform is to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform.

The Hough transform is a known technique for recognizing a white line having a maximum object candidate. That is, the Hough transform can recognize two white lines at both sides, the left side and the right side of the own vehicle on the roadway.

Next, the CPU 11 generates a bird's-eye image on the basis of the images obtained by the surrounding cameras 21b, 22 to 24, and recognizes white lines (or lane white lines) on the roadway on the basis of the generated bird's-eye image.

In more detail, in the surrounding camera white line recognition process S520 shown in FIG. 22, the CPU 11 performs a bird's-eye image conversion (S610).

In the bird's-eye image conversion (S610), the CPU 11 generates a bird's-eye image corresponding to each of the images obtained by the surrounding cameras 21b, 22 to 24, and integrates the generated bird's-eye images. The operation flow goes to step S620.

In step S620, the CPU 11 extracts one or more edges from the integrated bird's-eye image. The operation flow goes to step S630.

In step S630, the CPU 11 performs the Hough transform of the extracted edges in order to recognize one or more white lines (or lane white lines). The CPU 11 completes the surrounding camera white line recognition process S520.

Next, the CPU 11 performs the laser radar white line recognition process S530 shown in FIG. 22.

As shown in FIG. 22, the CPU 11 detects a peak of the reflected laser beam obtained by the laser radar device 25 (step S640). The laser radar device 25 is configured to perform laser beam scanning in a horizontal direction and at different angles in a vertical direction. This makes it possible to obtain strengths of reflected laser beams in a plurality of scanning lines. The CPU 11 detects the reflected laser beam having a maximum strength value in each scanning line. The operation flow goes to step S650.

In step S650, the CPU 11 performs the Hough transform for peak values of the reflected strength of the reflected laser beams in order to recognize a white line. The CPU 11 completes the laser radar white line recognition process S530 shown in FIG. 22. The CPU 11 performs an integration process S140 shown in FIG. 2.

Figure 27:
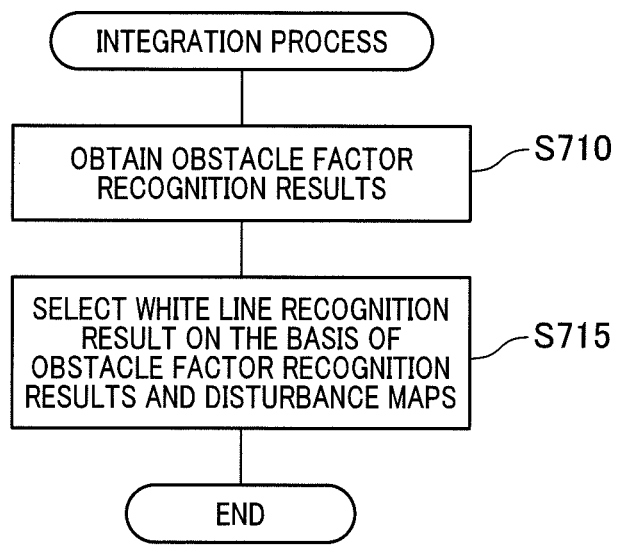
FIG. 27 is a flow chart showing an integration process S140 in the lane boundary line recognition process according to the exemplary embodiment shown in FIG. 2.

FIG. 27 is a flow chart showing the integration process S140 in the lane boundary line recognition process according to the exemplary embodiment shown in FIG. 2.

The integration process S140 determines, as a correct white line, one of the white lines (or lane white lines) detected by the plurality of the optical methods.

In the integration process S140, the CPU 11 receives obstacle factor recognition results (step S710) shown in FIG. 27. The operation flow goes to step S715.

In step S715, the CPU 11 selects the white line recognition result on the basis of the obstacle factor recognition results obtained in step S710 and disturbance maps (as a first disturbance map and a second disturbance map).

FIG. 28 is a view showing a first disturbance map, to be used by the lane boundary line recognition apparatus 1 according to the exemplary embodiment. The first disturbance map indicates a relationship between information to be used for recognizing obstructive factors, a sensor structure to be used for performing the white line judgment process, and the obstructive factors. FIG. 29 is a view showing a second disturbance map to be used by the lane boundary line recognition apparatus 1 according to the exemplary embodiment.

As shown in FIG. 28 and FIG. 29, the first disturbance map and the second disturbance map show the relationship between obstacle factors, information (such as map information, information transmitted from the millimeter wave radar device 26 and the sonar devices 27) to be used for recognizing a white line (or a lane white line) on a roadway, and a sensor structure (for example, the first front side camera 21*a*, the second front side camera 21*b*, the cameras 22 to 24, the laser radar 25, etc.).

In more detail, when a degree of rain exceeds a predetermined threshold value, rain is selected as the obstacle factor, and the CPU 11 selects the recognition result regarding the white line obtained by the first front side camera 21*a* having a narrow angle, as shown in FIG. 28.

Further, when the degree of afternoon sun exceeds a predetermined threshold value, the obstacle factor of afternoon sun is selected, and the CPU 11 selects the white line recognition result obtained by the surrounding camera white line recognition process S520 and the white line recognition result obtained by the laser radar white line recognition process S530, as shown in FIG. 28.

As previously described in detail, it is acceptable for the CPU 11 to calculate a weighted average between these white line recognition results obtained by the surrounding camera white line recognition process S520 and the laser radar white line recognition process S530. FIG. 28 also shows countermeasures corresponding to various obstacle factors.

As shown in FIG. 28, the sensor structure uses the surrounding cameras having a wide angle and the CPU 11 uses the recognition results transmitted from the millimeter wave radar device 26 and the sonar devices 27 when traffic congestion is the obstacle factor. In this case, the recognition results transmitted form the millimeter wave radar device 26 and the sonar devices 27 are used for detecting a traffic congestion, not used for recognizing a white line on a roadway.

Similar to the detection of a traffic congestion, when a roadwork is an obstacle factor, the sensor structure uses map in addition to the first front side camera having a narrow angle, the surrounding cameras having a wide angle and the laser radar device, and the CPU 11 uses the VICS information. In this case, the map information is used for detecting a roadwork on a roadway, not used for recognizing a white line (or a lane white line) on the roadway.

Further, when shadow on a roadway is an obstacle factor, as shown in FIG. 28, it is preferable for the CPU 11 to use the recognition result of the area having no shadow on the roadway transmitted from the laser radar device 25, and the recognition results of the area having the shadow on the roadway transmitted from the first front side camera 21*a* and/or the surrounding cameras 21*b*, 22 to 24.

Figure 30:
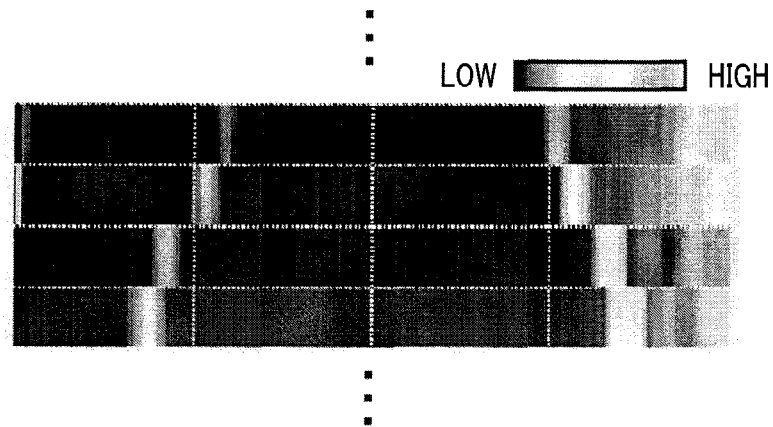
FIG. 30 is a view explaining an exemplary scene which shows a strength of reflected laser beam obtained from the laser radar device 25 when a shadow is present on a roadway.

FIG. 30 is a view explaining an exemplary scene which shows a strength of reflected laser beam obtained from the laser radar device 25 when a shadow is present on a roadway.

That is, FIG. 30 shows the detection result of reflected laser beam obtained by the laser radar device 25 when a scene shown in FIG. 9 has a shadow on a roadway. It can be understood form FIG. 30 that a peak in strength of the reflected laser beam appears on the area having a shadow.

In addition, when tunnel inlet-outlet is an obstacle factor, as shown in FIG. 29, the CPU 11 selects the recognition result of the white line obtained by the surrounding camera white line recognition process S520 and the recognition result obtained by the laser radar white line recognition process S530.

Figure 31:
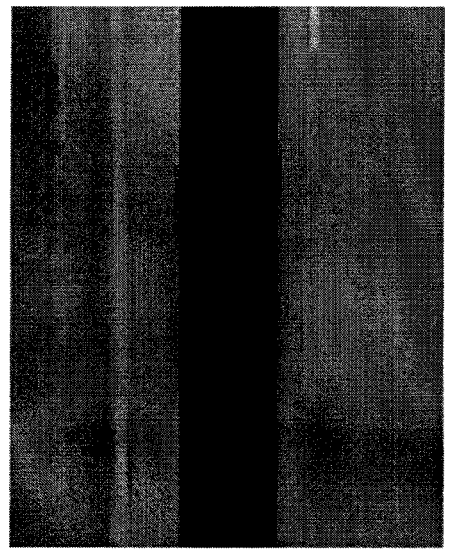
FIG. 31 is a view explaining a bird's-eye image as one of images obtained by the surrounding cameras 21b to 24 at a tunnel outlet on a roadway.

FIG. 31 is a view explaining a bird's-eye view as one of images obtained by the surrounding cameras 21*b* to 24 at a tunnel outlet on a roadway. As shown in FIG. 17, it is difficult for the front side camera 21*a* to correctly recognize a white line (or a lane white line) near a tunnel outlet on a roadway. However, as shown in FIG. 31, it is possible to correctly recognize the white line at the tunnel outlet on the roadway.

Figure 32:
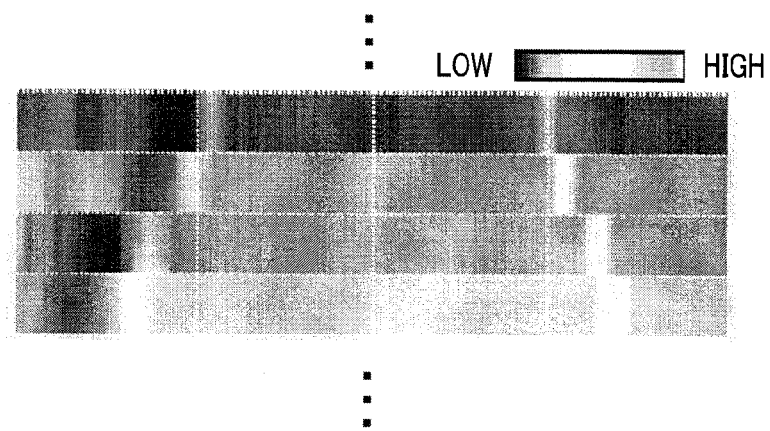
FIG. 32 is a view explaining an exemplary scene which shows a strength of reflected laser beam obtained by the laser radar device 25 at a tunnel outlet on a roadway.

FIG. 32 is a view explaining an exemplary scene which shows a strength of reflected laser beam obtained by the laser radar device 25 at a tunnel outlet on a roadway.

Furthermore, as shown in FIG. 32, it is possible to correctly recognize a peak of a reflected laser beam obtained by the laser radar device 25.

Figure 33:
FIG. 33 is a view explaining a bird's-eye image as one of images obtained by the surrounding cameras 21b to 24 at a tunnel inlet on a roadway.

FIG. 33 is a view explaining a bird's-eye image as one of images obtained by the surrounding cameras 21*b* to 24 at a tunnel inlet on a roadway.

As shown in FIG. 18, it is in general difficult to correctly recognize a white line in the image obtained by the first front side camera 21*a* having a narrow angle. On the other hand, as shown in FIG. 33, it is possible to correctly recognize a white line on a roadway in the bird's-eye image.

Figure 34:
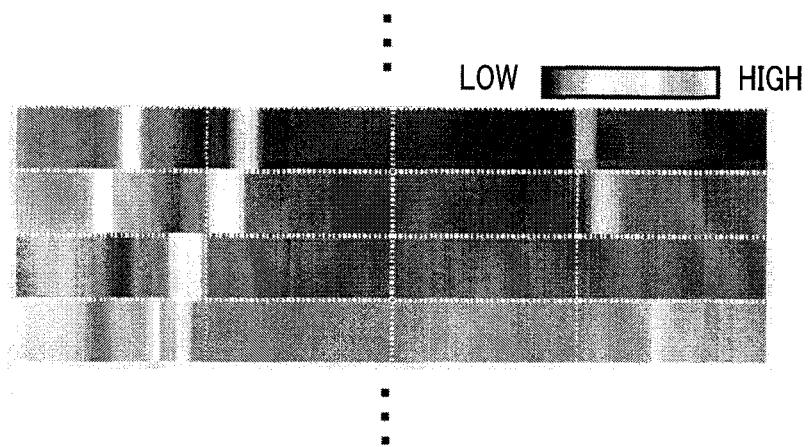
FIG. 34 is a view explaining an exemplary scene which shows a strength of reflected laser beam obtained by the laser radar device 25 at a tunnel inlet on a roadway.

FIG. 34 is a view explaining an exemplary scene which shows a strength of reflected laser beam obtained by the laser radar device 25 at a tunnel inlet on a roadway.

As shown in FIG. 34, it is possible to recognize a peak of a reflected laser beam obtained by the laser radar 25.

The CPU 11 completes the integration process S140 in the lane boundary line recognition process according to the exemplary embodiment shown in FIG. 2 after the selection of the white lines. In step S150 shown in FIG. 2, the CPU 11 outputs the white line recognition results. That is, in step S150, the CPU 11 generates image signals and output signals on the basis of the white lines which correspond to the white line recognition results. The CPU 11 outputs the generated image signals and output signals as the white line recognition results to the display section 32 and the vehicle control section 33.

When receiving the image signals and output signals, the display section 32 displays the received image, and the vehicle control section 33 performs various vehicle control processes on the basis of the received output signals. The CPU 11 completes the lane boundary line recognition process shown in FIG. 2.

Effects and Modifications

As previously described in detail, the CPU 11 in the lane boundary line recognition apparatus 1 receives information such as detection results transmitted from different optical devices, for example, the first front side camera 21*a* having a narrow angle, and the surrounding cameras and the laser radar device 25. The surrounding cameras are composed of the second front side camera 21*b* having a wide angle, the rear side camera 22, the left side camera 23 and the right side camera 24. The processing section 10, i.e. the CPU 11 further obtains surrounding environmental information. According to the obtained surrounding environmental information, the CPU 11 selects one or more devices from the first front side camera 21*a*, the second front side camera 21*b*, the rear side camera 22, the left side camera 23, the right side camera 24, and the laser radar device 25.

According to the lane boundary line recognition apparatus 1 having the structure previously described, lane boundary lines are recognized by using the different optical devices and methods, and the optimum detection devices suitable for the surrounding environmental information can correctly recognize the lane boundary lines, etc. This makes it possible to correctly recognize the lane boundary lines, etc. with high accuracy.

The processing section 10 in the lane boundary line recognition apparatus 1 having the structure previously described obtains surrounding environmental information regarding one or more obstacle factors which prevent a correct recognition of a lane boundary line. The CPU 11 selects one or more the cameras 21a, 21b, 22 to 24 suitable for correct recognition of a lane boundary line such as a white line on a roadway on the basis of the obtained surrounding environmental information.

The lane boundary line recognition apparatus 1 having the structure previously described receives such obstacle information which would otherwise prevent the correct recognition of a lane boundary line. This makes it possible to select one or more optical devices from these cameras 21, 21b, 22 to 24 and the laser radar device 25 in order to correctly recognize a lane boundary line according to the surrounding environment.

In addition to the features and effects previously described, the processing section 10 in the lane boundary line recognition apparatus 1 receives surrounding environmental information generated on the basis of the sensor information transmitted from the sensors mounted to the own vehicle. It is therefore possible for the CPU 11 to select the optimum devices from the cameras 21a, 21b and 22 to 24 and the laser radar device 25 on the basis of the sensor information.

The processing section 10 in the lane boundary line recognition apparatus 1 obtains a current location of the own vehicle, and further obtain surrounding environmental information of the own vehicle on the basis of the information regarding the current location of the own vehicle.

It is therefore possible for the CPU 11 in the processing section 10 to correctly select the optimum devices from the cameras 21a, 21b and 22 to 24 and the laser radar device 25 on the basis of the current location of the own vehicle.

The processing section 10 in the lane boundary line recognition apparatus 1 obtains map information corresponding to the current location of the own vehicle as environmental information. Because of using the map information, the processing section 10 can correctly recognize various points on the roadway, at which surrounding environment are changed, for example, a tunnel-inlet, a tunnel-outlet, a road slope, etc., on the basis of the map information. It is therefore possible for the processing section 10 to correctly select the optimum devices, suitable for detecting the points on the roadway, from the cameras 21a, 21b and 22 to 24 and the laser radar device 25.

The processing section 10 in the lane boundary line recognition apparatus 1 obtains environmental information obtained on the basis of a difference between the lane boundary recognition results obtained by the cameras 21a, 21b, 22 to 24 and the laser radar device 25.

The lane boundary line recognition apparatus 1 having the structure previously described can recognize, or remove candidates of lane boundary lines, which are recognized only by some devices selected form the cameras 21a, 21b, 22 to 24 and the laser radar device 25. For example, the CPU 11 in the processing section 10 removes a candidate of a lane boundary line which can be recognized in the camera image, but not be recognized by the laser radar device 25.

Lane boundary line recognizers corresponds to the first front side camera 21a, the second front side camera 21b, the rear side camera 22, the left side camera 23, the right side camera 24, the laser radar device 25, and the process in step S130 performed by the CPU 11 in the processing section 10.

A location obtaining section corresponds to the process in step S110 performed by the CPU 11 in the processing section 10. An environmental information obtaining section corresponds to the process in step S110, the process in step S120 and the processes in steps S552 to S558.

A selection section corresponding to the process in step S140 and the processes in steps S560 to S564.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A lane boundary line recognition apparatus capable of recognizing a lane boundary line of a vehicle lane on a roadway on which an own vehicle drives, the lane boundary line separating an inside of the vehicle lane, on which the own vehicle drives, from the outside of the vehicle lane, the lane boundary line recognition apparatus comprising:
   a plurality of boundary line recognizers comprising an optical sensor, each boundary line recognizer having a different detection range that recognizes a lane boundary line by using a different optical detection method from other boundary line recognizers; and
   a processing section comprising a central processing unit and including an environmental information obtaining section and a selection section, wherein
   the environmental information obtaining section is configured to obtain environmental information from the plurality of boundary line recognizers which represent a surrounding environment of the own vehicle regarding obstacle factors preventing correct recognition of a lane boundary line; and
   the selection section is configured to select at least one optimum boundary line recognizer of the boundary line recognizers on the basis of the obtained environmental information suitable for recognizing the lane boundary line of the vehicle lane of the own vehicle.

2. The lane boundary line recognition apparatus according to claim 1, wherein the environmental information obtaining section obtains the environmental information generated on the basis of sensor information transmitted from sensors mounted to the own vehicle.

3. The lane boundary line recognition apparatus according to claim 1, further comprising a current location obtaining section capable of obtaining a current location of the own vehicle,
   wherein the environmental information obtaining section obtains the environmental information corresponding to the current location of the own vehicle.

4. The lane boundary line recognition apparatus according to claim 3, wherein the environmental information obtaining section obtains, as the environmental information, map information corresponding to the current location of the own vehicle.

5. The lane boundary line recognition apparatus according to claim 1, wherein the environmental information obtaining section obtains, as the environmental information, information which indicates a difference between the recognition results of the boundary line recognizers.

6. A non-transitory computer-readable storage medium for storing a program for performing processes to be executed by a central processing unit for performing the functions of the boundary line recognizers, the environmental information obtaining section and the selection section according to claim 1.

7. The lane boundary line recognition apparatus according to claim 1, wherein the boundary line recognizers comprise cameras and radar devices.

8. The lane boundary line recognition apparatus according to claim 1, wherein the boundary line recognizers comprise a camera having a narrow angle and a camera having a wide angle.

9. The lane boundary line recognition apparatus according to claim 1, wherein the environmental information obtained by the environmental information obtaining section includes information regarding at least one of rain, afternoon sun, shadow, night, traffic congestion, road work, change of longitudinal slope, tunnel-inlet and outlet, shape curve, branch point, junction point, asphalt road and concrete road.

10. A lane boundary line recognition apparatus capable of recognizing a lane boundary line of a vehicle lane on a roadway on which an own vehicle drives, the lane boundary line separating an inside of the vehicle lane, on which the own vehicle drives, from the outside of the vehicle lane, the lane boundary line recognition apparatus comprising:
a plurality of boundary line recognizers comprising a camera having a narrow angle and a camera having a wide angle;
a processing section comprising a central processing unit and including an environmental information obtaining section and a selection section, wherein
the environmental information obtaining section is configured to obtain environmental information from the plurality of boundary line recognizers which represent a surrounding environment of the own vehicle regarding obstacle factors preventing correct recognition of a lane boundary line;
the environmental information obtained by the environmental information obtaining section includes information regarding at least one of rain, afternoon sun, shadow, night, traffic congestion, road work, change of longitudinal slope, tunnel-inlet and outlet, shape curve, branch point, junction point, asphalt road and concrete road, and
the selection section that selects at least one of the boundary line recognizers on the basis of the obtained environmental information suitable for recognizing the lane boundary line of the vehicle lane of the own vehicle, and
the selection section selects the camera having a narrow angle where the obtained environmental information indicates traffic congestion.

11. The lane boundary line recognition apparatus according to claim 9, wherein the boundary line recognizers comprise radar devices, and
the selection section selects the radar devices when the obtained environmental information indicates night.

12. The lane boundary line recognition apparatus according to claim 1, wherein the selection section selects at least one of the boundary line recognizers on the basis of the detection results of the boundary line recognizers.

13. A lane boundary line recognition apparatus capable of recognizing a lane boundary line of a vehicle lane on a roadway on which an own vehicle drives, the lane boundary line separating an inside of the vehicle lane, on which the own vehicle drives, from the outside of the vehicle lane, the lane boundary line recognition apparatus comprising:
a plurality of boundary line recognizers comprising an optical sensor, each boundary line recognizer having a different detection range that recognizes a lane boundary line by using a different optical detection method from other boundary line recognizers;
a processing section comprising a central processing unit which includes an environmental information obtaining section, a white line determination section and a selection section, wherein
the environmental information obtaining section is configured to obtain environmental information from the plurality of boundary line recognizers which represent a surrounding environment of the own vehicle regarding obstacle factors preventing correct recognition of a lane boundary line;
the white line determination section is configured to obtain white line information from the plurality of boundary line recognizers which represent a surrounding environment of the own vehicle regarding road edge factors concerning validity of a lane white line; and
the selection section is configured to determine validity of a lane white line and to select at least one optimum boundary line recognizer of the boundary line recognizers, based on a valid lane white line and the obtained environmental information suitable for recognizing the lane boundary line of the vehicle lane of the own vehicle.

* * * * *